US010394843B2

(12) United States Patent
Lee et al.

(10) Patent No.: US 10,394,843 B2
(45) Date of Patent: Aug. 27, 2019

(54) METHOD AND APPARATUS FOR PERSONAL ASSET MANAGEMENT

(75) Inventors: Wei Yeh Lee, New York, NY (US); Sergey Boldyrev, Söderkulla (FI); Ian Justin Oliver, Söderkulla (FI)

(73) Assignee: HERE Global B.V., Veldhoven (NL)

( * ) Notice: Subject to any disclaimer, the term of this patent is extended or adjusted under 35 U.S.C. 154(b) by 587 days.

(21) Appl. No.: 13/538,174

(22) Filed: Jun. 29, 2012
(Under 37 CFR 1.47)

(65) Prior Publication Data
US 2013/0124463 A1    May 16, 2013

Related U.S. Application Data

(60) Provisional application No. 61/504,045, filed on Jul. 1, 2011.

(51) Int. Cl.
| | |
|---|---|
| *G06F 7/00* | (2006.01) |
| *G06F 16/27* | (2019.01) |
| *G06F 21/60* | (2013.01) |

(52) U.S. Cl.
CPC ............ *G06F 16/27* (2019.01); *G06F 21/606* (2013.01)

(58) Field of Classification Search
CPC .................................................. G06F 21/606
USPC .................. 707/999.101, 999.102, 636, 621
See application file for complete search history.

(56) References Cited

U.S. PATENT DOCUMENTS

| | | | | |
|---|---|---|---|---|
| 8,782,243 B2* | 7/2014 | Lee | ......................... | H04W 4/60 709/226 |
| 8,917,971 B2* | 12/2014 | Woods | ................... | H04N 5/765 386/200 |
| 8,977,561 B2* | 3/2015 | Vodopia | ............... | G07G 1/0045 705/20 |
| 9,009,794 B2* | 4/2015 | Dykeman | ............... | G06F 21/10 726/4 |
| 2009/0237253 A1* | 9/2009 | Neuwirth | ............... | G06Q 10/06 340/572.1 |
| 2011/0016379 A1* | 1/2011 | McColl | ................. | G06F 17/246 715/219 |
| 2011/0320345 A1* | 12/2011 | Taveau | .................. | G06Q 20/32 705/39 |
| 2012/0054201 A1* | 3/2012 | Fischer | .................. | G06Q 10/06 707/748 |
| 2012/0144041 A1* | 6/2012 | Lee | ......................... | H04W 4/60 709/226 |
| 2012/0192084 A1* | 7/2012 | Dura | ..................... | G06F 3/0481 715/751 |
| 2013/0006924 A1* | 1/2013 | Logan | ............ | H04M 1/274516 707/609 |

(Continued)

*Primary Examiner* — Eliyah S. Harper
(74) *Attorney, Agent, or Firm* — Ditthavong & Steiner, P.C.

(57) ABSTRACT

An approach is provided for personal asset management. The approach involves causing, at least in part, a determination of one or more devices to be part of one or more groups. The approach further involves processing and/or facilitating a processing of a determination of one or more datasets to be stored on the one or more devices. The approach also involves causing, at least in part, the one or more datasets to be synchronized among the one or more devices that are part of the one or more groups. The approach additionally involves causing, at least in part, a cryptographic connection between the one or more devices to be established.

20 Claims, 23 Drawing Sheets

(56) References Cited

U.S. PATENT DOCUMENTS

| | | | | |
|---|---|---|---|---|
| 2013/0109371 A1* | 5/2013 | Brogan | ................ | G06F 1/1626 |
| | | | | 455/420 |
| 2013/0124672 A1* | 5/2013 | Pan | ..................... | H04N 21/214 |
| | | | | 709/217 |
| 2013/0268396 A1* | 10/2013 | Agevik | ............. | G06Q 30/0631 |
| | | | | 705/26.7 |

* cited by examiner

FIG. 4A
400

USER PROFILE CONFIGURATION (PERSONAL DATA)

DEMOGRAPHIC INFORMATION

Role: [Choose One ▾] Industry: [Choose One ▾]
Location Size: [Don't know ▾] Org Size: [Don't know ▾]
Headquarters: Country: [USA] State: [NY] #Locations: [Don't know ▾]

— 406a
— 403

EDUCATION HISTORY

Primary: ABC Elementary School — Graduation 1980 — GPA 4.0
Middle: ABC Middle School — Graduation 1984 — GPA 4.0
High: ABC High School — Graduation 1988 — GPA 4.0
College: ABC College — Graduation 1992 — GPA 4.0
Graduate: ABC University — Graduation 1994 — GPA 4.0

— 406b
— 405

[PREV] — 407
[UPDATE] — 409
[CANCEL] — 411

424

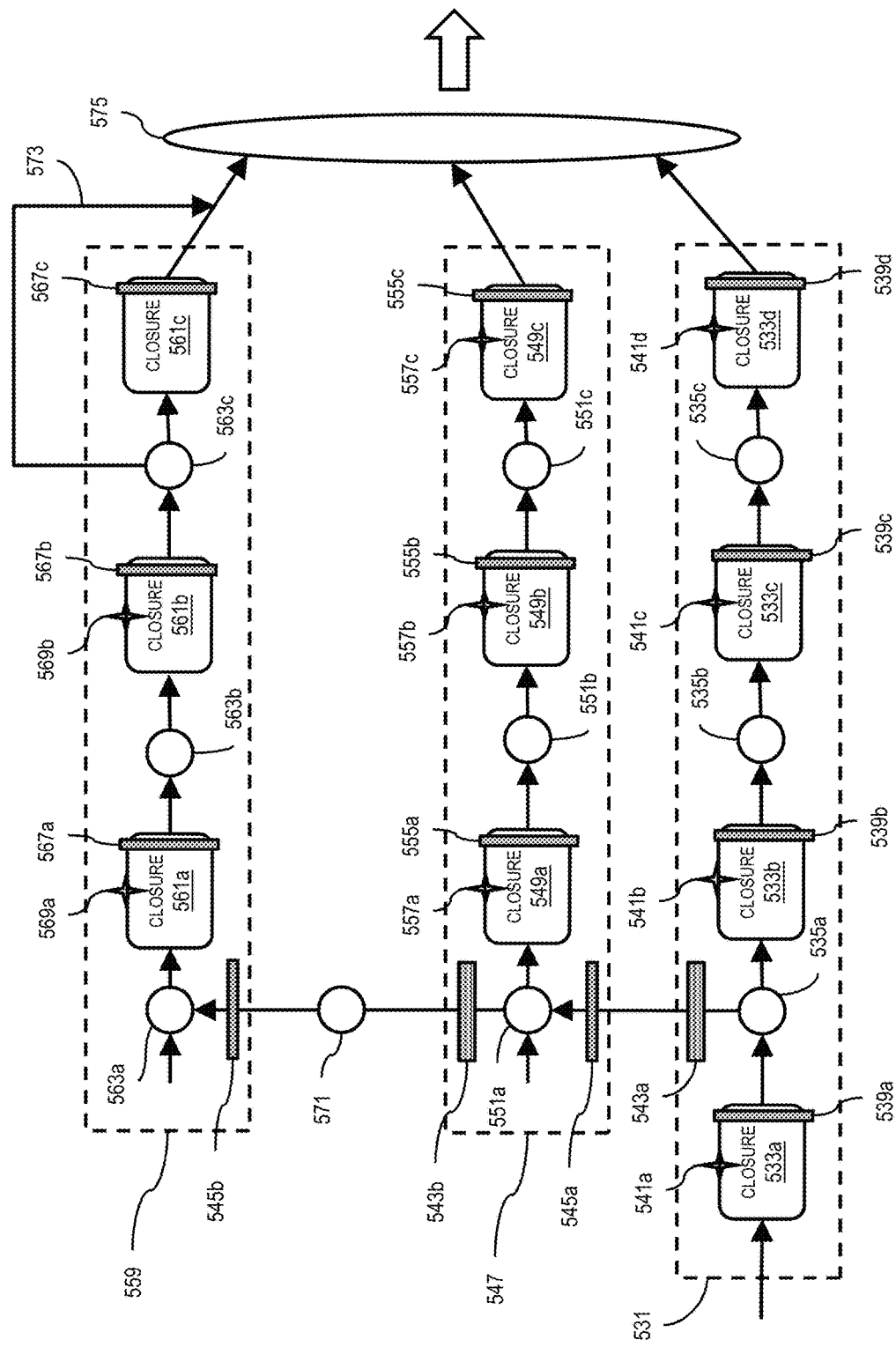

US 10,394,843 B2

METHOD AND APPARATUS FOR PERSONAL ASSET MANAGEMENT

RELATED APPLICATIONS

This application claims benefit of the earlier filing date under 35 U.S.C. § 119(e) of U.S. Provisional Application Ser. No. 61/504,045 field Jul. 1, 2011, entitled "Method and Apparatus for Personal Asset management," the entirety of which is incorporated herein by reference.

BACKGROUND

Service providers (e.g., wireless and cellular services) and device manufacturers are continually challenged to deliver value and convenience to consumers by, for example, providing compelling network services and advancing the underlying technologies. One area of interest has been the realm of asset management regarding tracking and locating items that belong to a user or group, as well as allowing these items to access personal data that is available in a cloud computing environment.

SOME EXAMPLE EMBODIMENTS

Therefore, there is a need for an approach for creating an inventory of assets and enabling the assets to have access to a central database of information.

According to one embodiment, a method comprises causing, at least in part, a determination of one or more devices to be part of one or more groups. The method also comprises processing and/or facilitating a processing of a determination of one or more datasets to be stored on the one or more devices. The method further comprises causing, at least in part, the one or more datasets to be synchronized among the one or more devices that are part of the one or more groups. The method additionally comprises causing, at least in part, a cryptographic connection between the one or more devices to be established.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a determination of one or more devices to be part of one or more groups. The apparatus is also caused to cause, at least in part, a determination of one or more devices to be part of one or more groups. The apparatus is further caused to cause, at least in part, the one or more datasets to be synchronized among the one or more devices that are part of the one or more groups. The apparatus is additionally caused to cause, at least in part, a cryptographic connection between the one or more devices to be established.

According to another embodiment, a computer-readable storage medium carries one or more sequences of one or more instructions which, when executed by one or more processors, cause, at least in part, an apparatus to cause, at least in part, a determination of one or more devices to be part of one or more groups. The apparatus is also caused to cause, at least in part, a determination of one or more devices to be part of one or more groups. The apparatus is further caused to cause, at least in part, the one or more datasets to be synchronized among the one or more devices that are part of the one or more groups. The apparatus is additionally caused to cause, at least in part, a cryptographic connection between the one or more devices to be established.

According to another embodiment, an apparatus comprises means for causing, at least in part, a determination of one or more devices to be part of one or more groups. The apparatus also comprises means for processing and/or facilitating a processing of a determination of one or more datasets to be stored on the one or more devices. The apparatus further comprises means for causing, at least in part, the one or more datasets to be synchronized among the one or more devices that are part of the one or more groups. The apparatus additionally comprises means for causing, at least in part, a cryptographic connection between the one or more devices to be established.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams of user interfaces representing various functional flows for enabling the control and sharing of user profile information, according to various embodiments;

FIGS. 5A and 5B are diagrams of distribution of controlled user profile information and energy optimization in multi-level computational architecture, according to various embodiments;

DESCRIPTION OF SOME EMBODIMENTS

Figure 1:
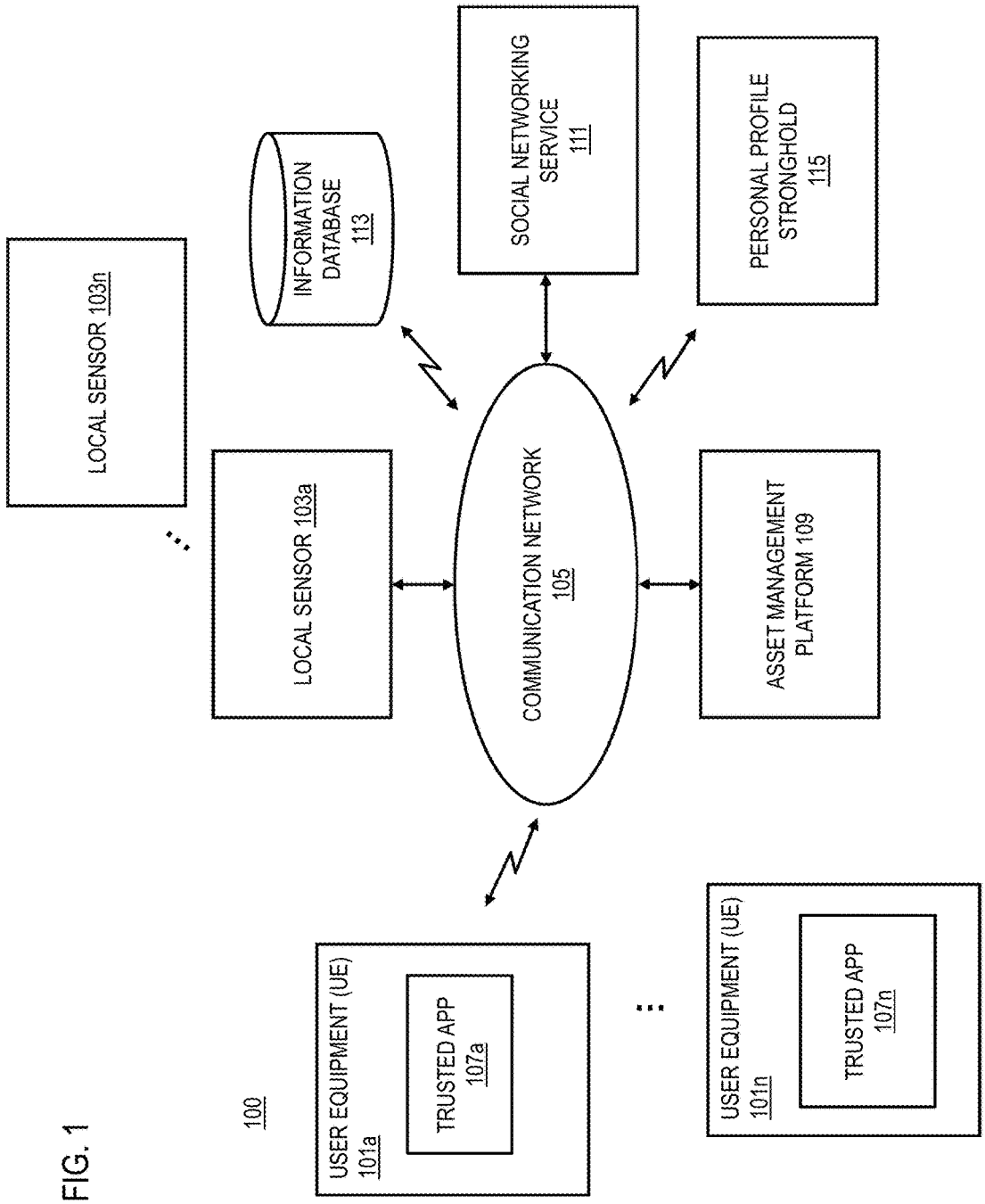
FIG. 1 is a diagram of a system capable of creating an inventory of assets and enabling the assets to have access to a central database of information, according to one embodiment.

Examples of a method, apparatus, and computer program for creating an inventory of assets and enabling the assets to have access to a central database of information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid FIG. 1 is a diagram of a system capable of creating an inventory of assets and enabling the assets to have access to a central database of information, according to one embodiment. Consumers surfing the internet have little or no control over the profile information that is gathered about them on the internet. Consumers have a mechanism to capture and configure their own behavioral data via a central database such as a Personal Profile Stronghold (PPS). An implementation of PPS can be built on top of any generic information management system such that users can manage their data and information from a central location and enable all of their assets to have access and be updated according to this central database. A PPS profile is a profile that stores information regarding a user's preferences and history of usage of various devices and internet websites, as well as what information may be shared with others, and any organizational schemes that a user may define. The PPS profile may be fully customizable and editable depending on a user's personal preferences. The PPS profile may also act as a means to link contact information and other social networking media, as well as other information that may be stored in an alternative database. The PPS may act as a firewall of sorts in that it limits what data is accessible by others, and by what means. These preferences and groupings may be further defined, as discussed below.

Users typically own more than one device. These devices may vary and be a mobile device such as a cell phone, a laptop, tablet computer, or other electronic device such as a desktop computer, television, camera, etc. Other assets such as wallets, cars, purses, any general belonging may be tagged with an RFID tag or some other short range asset management means so that the item may be tracked and considered as a device for the remainder of this discussion. These devices, together, form a personal cloud of all consumer devices together running PPS endpoints. The personal cloud is also an authenticated, cryptographically protected, and hosted PPS endpoint solely for that user's use.

Users need a simple method to determine what profile resources to share with whom. It would, therefore be advantageous to provide an easy to use interface for users to have full control over their personal profile data including: Personal Data Resource Management, Personal Group Management, and Personal Sharing Management.

To address this problem, a system 100 of FIG. 1 introduces the capability to create an inventory of assets and enable the assets to have access to a central database of information. Users of the system 100 can manage their affiliation with groups of contacts, or organize their contacts that may be loaded from the contact information available from external sources such as, but not limited to, Outlook, Gmail, Facebook, etc. In the PPS, users can manage their relationship with groups, manage all of their devices and instruct them to receive data, manage data in general, create data resource packages, assign data resource packages to be cached on specific devices, share data resource packages with groups or individuals, etc.

A trusted app agent may be built on top of the PPS and a set of low-cost tags such as RFID, Zigbee, NFC, etc. that allows the user to easily tag an item they own. Based on the tags, the user may then create an inventory of those items that includes, for example, sku#, color, device name, purchase date, person's sentiment toward the item, photo of the item, person's review of the item, the precise location of the item at this time, etc. The item can have a software compass that helps the user find the specific item by using any of the above tagging technologies along with triangulation. Building the trusted app agent on top of the information database enables the ability to synchronize data and actions across all Personal Cloud end-points (items belonging to the user in the personal cloud) and allow for all of these items to have access to the PPS.

In one embodiment, the system 100 includes one or more user equipment (UEs) 101a-101n (e.g., also collectively referred to as UEs 101) having trusted apps 107a-107n (e.g., also collectively referred to as trusted app 107) capable of detecting a local sensor 103a-103n (e.g., also collectively referred to as local sensor 103) that is, for instance, a tag or transponder using a short range communication link (e.g., near field communication (NFC) such as RFID, Bluetooth®, etc.). The local sensor 103 can then be tracked or located through the UEs 101 that are equipped with, for instance, a directional antenna or other detector tuned to the local sensor 103. The local sensor may be on board the UE 101 or remote. As used herein, the term "remotely locate" refers to the capability a UE 101a that is outside of the normal tracking range of the local sensor 103 to track the local sensor 103 by enabling other UEs 101b-101n that are nearby the out-of-range local sensor 103 to relay tracking or location information of the local sensor 103 to the UE 101a over, for instance, a communication network 105. In this way, the UE 101a can navigate to the local sensor 103 based on the location information provided by one or more of the UEs 101b-101n, thereby advantageously reducing the burden (e.g., device resources burden) associated with searching for the out-of-range local sensor 103 without the aid of the other UEs 101b-101n. In other words, the system 100 connects or otherwise links the UEs 101a-101n so that one or more of the UEs 101a-101b can provide local sensor 103 tracking information to other ones of the UEs 101a-101n when a particular one of the UEs 101a-101n is out of local tracking range of the local sensor 103.

In yet another embodiment, the UE 101a and/or the asset management platform 109 detects all of the UE 101's that are part of the user's personal cloud and based on the local sensors 103 will enable access by the UE 101 to update its information or have access to information stored at the information database 113 such as contact information queried from a social networking service 111 or other email service, or various user preferences. The trusted app 107 enables the user to control the information management and have access to the information database by way of the asset management platform 109.

In the PPS 115, the user has full control over *ALL* personal data that is gathered about a user while the user is accessing the various websites on the internet. This includes all search terms, click throughs, web pages visited, etc. The system 100 enable user to easily and explicitly define which personal data to collect or no, manage personal data resources, manage contact and group resources, manage sharing permissions, grant access to groups or individuals to specific personal data resources, update access to groups or individuals to specific personal data resources, remove access to groups or individuals to specific personal data resources, etc.

A user can also set an alarm, so if an item moves farther than a certain distance from a sensor (like the mobile phone, or sensor at home) then the user is notified (e.g. alarm goes off or gets email, etc). A user, therefore, could determine where the user last left an item or if the user's wallet has moved farther away from a location than the user would like. A notification could also be incorporated into a mechanical device such as a buzzer on a bracelet.

Personal asset management enriches the value of the user's profile such that information regarding what assets the user has as part of his personal cloud may be aggregated as data that may be used to target advertisers and publishers for sale of information about the user or to directly advertise to the user via UE 101 or some other medium.

In various embodiments, the system 100 enables the user to keep a detailed inventory of all items owned. In the trusted app 107, vendor registration card capability may be implemented to enable the consumer to register their product easily and automatically with a manufacturer, for example. This will enable warranties and customer support for their products. From a product maker's perspective, the registration data is extremely important to be able to identify a consumer. Product makers can now have an opportunity to open a dialogue with the consumer through the use of the system 100 and may create new offers of questionnaire answering, focus groups, etc. to the market segment of users who are known to own their products.

Big box retailers often have loyalty plans designed to bring consumers back to the their retail stores by giving them incentives in the form of (1) cash back, (2) points that can be used for discounts, or (3) coupons. With the PPS 115, the trusted app 107 keeps track of all value earned by the consumer in terms of retailer points, analyzes the consumer's profile, identifies and pulls the vendor's best deals that are relevant for their consumer, enables the consumer to visualize the points gathered, and enables the consumer to exchange vendor specific points for retailer points which can then be exchanged for other vendor points (in effect, it allows the consumer to use retailer points across vendors within the retailer loyalty network).

The economic goal of a cross vendor loyalty plan establishment is to improve relationships between demand and supply by providing new and better ways for the former to engage with and drive the latter. This is not possible when all the tools of engagement are provided by suppliers, and all those tools are different. For example, most customers today carry around up to dozens of "loyalty" cards and key-ring tags, each with its own vendor-provided means for controlling interactions and providing benefits. These inconvenience both buyers and sellers, and limit the intelligence that can be gathered and put to use by either party.

But, with the PPS 115 discussed above, buyers could have the ability to advertise their shopping lists to the sellers with which they have relationships. Buyers could establish and maintain loyalty on their own terms and in their own ways. Customers could express preferences and advertise demand in a manner that is improved to the point where sellers could reduce money wasted on advertising and other forms of guesswork. With PPS is would also be easy for customers to say what they'll pay for what they want, on their own terms (and to pay on the spot, if the terms are mutually agreeable). Vendor relationship management tools and services may enable many of the above possibilities by pulling information from detected internet usage.

In various embodiments, customer loyalty networks may be used to reduce conflicts of interest. A loyalty network might select one competitor in each retail market segment. For example, American Airlines would include American Airline points that work only for AA and the partner rewards network. Consumers find this restrictive. In a cross vendor loyalty plan, for example, plan points enable consumers to dynamically choose to use and apply their points across even competing vendors. In the same way countries manage exchange rates between countries, the loyalty plan provider manages the point exchange rate between the plan points and the store's points system. The system of course monitors and eliminates arbitrage situations.

From a reward perspective, the trusted app will account for retailer points from a multitude of activities including:
(1) purchasing products
(2) seeing advertisements
(3) responding to questionnaires
(4) participating in focus groups
(5) making more healthy choices for health points
(6) making more safe driving choices for driver insurance points
(7) etc.

Based on a user's PPS profile, and the deals available in an anonymous profile marketplace, the retailer plan privately selects the best method for the consumer to be rewarded (cash, points, coupons, etc.).

In the cross loyalty vendor plan, relationships must be voluntary, users must enter relationships with vendors as independent actors, users must be the points of integration for their own data, users must have control of data they generate and gather, users must be able to share data selectively, voluntarily, and control the terms of its use, users must be able to assert their own terms of engagement and service, and users must be free to express their demands and intentions outside of any one company's control.

The above mentioned cross loyalty vendor plan provides tools for individuals to manage relationships with organizations. These tools are personal. Individuals are the collection centers for their own data, so that transaction histories, health records, membership details, service contracts, and other forms of personal data are no longer scattered throughout a forest of silos. Users have the ability to share data selectively, without disclosing more personal information than the individual allows. Users have the ability to control how their data is used by others, and for how long. Users have the ability to assert their own terms of service, reducing or eliminating the need for organization-written terms of service that nobody reads and everybody has to "accept" anyway. Users have a means for expressing demand in the open market, outside any organizational silo, without disclosing any unnecessary personal information. Users also are platforms for business by opening the market to many kinds of third party services that serve buyers as well as sellers. And relationship-managing tools are based on open standards, such as open APIs (application program interfaces), and open code. This supports a rising tide of activity that will lift an infinite variety of business boats, plus other social goods.

In various embodiments, personal data can be collected in any of the following ways: communication logging (HTTP, Email, SMS, IM, Skype, etc.), device sensor logging (activity, GPS, photos, audio, etc.), personal data entry (forms entry, contextual data entry, etc.), personal profile data extraction (demographic, firmographic, behavioral, etc.), for example.

Each collection mechanism is a functional flow that can constitute PPS. Users may have control over each of these collection mechanisms by choosing to invoke a certain functional flow or not by way of the trusted app 107. If the user elects to invoke collection mechanism through a certain functional flow, then there will be a simple end user license agreement that defines exactly what data they are collecting. From a simplicity perspective, the user can choose, at a macro level, the collection template to use via a slider in a user interface, for example (e.g. Minimal, Medium, Complete). The user can then elect to use the functional flow configuration interface to further customize by enabling/disabling specific behavioral attributes from being collected.

Users may have the ability to visualize any raw data that is collected such as log data, profile data, device data, etc. by way of the trusted app 107. Personal Data can be packaged by date interval, time interval, geospatial extent, functional flow that generated the data, specific attribute, speed, direction, etc. Users may also create new packages, and manage personal data that was manually entered such that the data may be updated and deleted through a web form.

In various embodiments, users may import contacts from other sources like Outlook, Gmail, Facebook, LinkedIn, etc. The trusted app 107 may review the contacts and remove any duplicate entries and merge the contacts. The user may create groups of contacts by dragging and dropping contacts into one or more groups using the trusted app 107 that interfaces with the PPS 115. The user may use a group view to look at a specific group and what contacts are associated with the group as well as what personal data resources are available to the group. The user may also have the ability by way of a contact view user interface to look at all the groups that a particular contact belongs to and view all of the personal data resources a contact has access to.

In various embodiments, the user may manage any sharing of personal or contact data by assigning personal data resources to one or more groups. Each of these grants allows the user to customize the package by time, geospatial extent, functional flow, attribute, etc. While viewing Personal Data, a user can easily update data sharing in context. User own and control all aspects of their own data in an easy to use interface on their own user hosted personal cloud of devices.

FIG. 1 is a diagram of a system 100 capable of creating an inventory of assets and enabling the assets to have access to a central database of information, according to one embodiment. Technology-based tracking and locating services (e.g., RFID or GPS based lost-and-found services) are becoming increasingly popular among consumers, particularly for locating easily lost or stolen items such as electronics, keys, pets, cars, and the like. Other approaches that provide for longer range tracking (e.g., GPS-enabled tags and transponders). As described with respect to FIG. 1, the system 100 includes one or more local sensors 103 that can be attached, embedded, or otherwise associated with items so that the items may be tracked or located via a remote lost-and-found service. In one embodiment, the local sensor 103 is a transponder (e.g., an RFID tag, a near field communication (NFC) tag, etc.) comprising, at least in part, a small microchip that is attached to an antenna. By way of example, such transponders come, for instance, in a wide variety of sizes, shapes, and forms and can be read through most materials with the exception of conductive materials like water, metal, and the like.

It is noted that there are generally two types of transponders, passive transponders and active transponders, both of which may be used as local sensors 103. Passive transponders are generally smaller, lighter, and less expensive than active transponders and can be applied or attached to objects in harsh environments. They are also maintenance free and can last for years. Passive transponders are only activated when within the response range of a transponder reader or detector (e.g., the directional antenna or detector of the UE 101 described above). In one embodiment, the transponder reader or detector emits a low-power radio wave field that is used to power the passive transponder so as to pass on any information (e.g., information to identify the local sensor 103) that is contained in the transponder. Moreover, the information in passive transponders is often static and generally includes, for instance, information for specifying a static identification code. Because information in the passive transponder is static and not programmable, the trusted app 107 and/or the asset management platform 109 may dynamically associate the static identification code with a paired UE 101 so that the paired UE 101 can be located or grant visibility rights because it is associated with the local sensor 103.

As shown in FIG. 1 and as previously described above, the UEs 101a-101b have connectivity to each other over the communication network 105 for sharing location and related information about the local sensor 103. It is contemplated that the system 100 may support any number of UEs 101 up to the maximum capacity of the communication network 105. For example, the network capacity may be determined based, at least in part, on available bandwidth, available connection points, and/or the like. The UEs 101a-101n may further include a location sensor such as a GPS module, assisted GPS module (a-GPS), or the like for determining its location with respect to, for instance, one or more GPS satellites. In addition or alternatively, the UEs 101a-101n may use any other location determination technology well-known in the art such as cellular triangulation, Wifi-based location determination, etc.

In one embodiment, the UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.) to present local tracking information (e.g., provided by local sensor manager 107) as well as for presenting mapping or navigation obtained via onboard location sensors (e.g., GPS receivers) or remotely provided by other UEs 101 and/or external location-based services.

By way of example, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. Accordingly, in one embodiment, the system 100 links the UEs 101a-101n, the local sensors 103a-103n, the asset management platform 109, the social networking service 111, the information database 113 and the PPS 115 over a combination of the longer range cellular network and data network (e.g., the Internet) of the communication network 105 and the local connections between one or more of the UEs 101a-101n (e.g., via the local sensor manager 107) and the local sensor 103 to provide the remote lost-and-found service described herein.

In one embodiment, the trusted app 107 and the asset management platform 109 interact according to a client-server model to provide the functions of the inventory management of assets and the enablement of the assets to have access to the information database 113. More specifically, either of the trusted app 107 or the asset management platform 109 alone or in combination may perform any of the functions of the system 100 described herein. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the UEs 101a-101b, the local sensors 103, the asset management platform 109, the social networking service 111, the information database 113, and the PPS 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
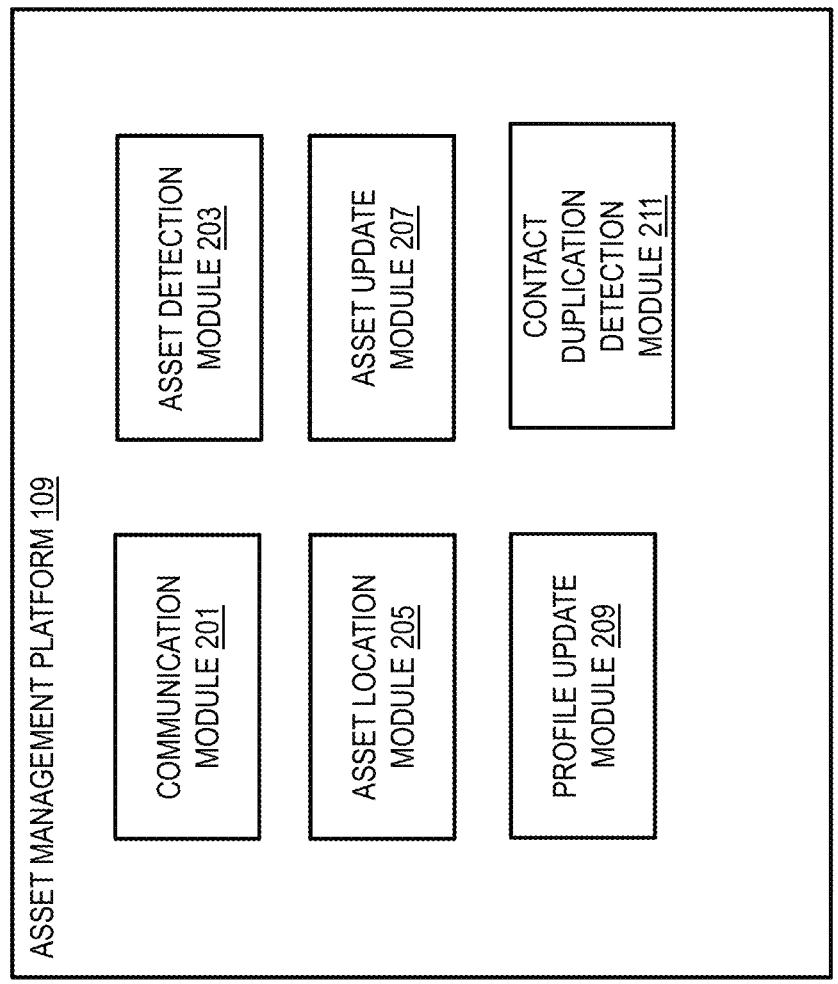
FIG. 2 is a diagram of the components of an asset management platform, according to one embodiment.

FIG. 2 is a diagram of the components of an asset management platform 109, according to one embodiment. By way of example, the asset management platform 109 includes one or more components for creating an inventory of assets and enabling the assets to have access to a central database of information. It is contemplated that the functions of these components may be combined in one or more components or performed by other components of equivalent functionality. In this embodiment, the asset management platform 109 includes a communication module 201, an asset detection module 203, an asset location module 205, an asset update module 207, a profile update module 209 and a contact duplication detection module 211.

In various embodiments, the asset management platform 109 communicates with the other network components of the system 100 by way of the communication module 201. The asset detection module 203 determines what assets (UEs 101) are tagged and considered to be part of the user's personal cloud. The asset location module 205 is used to determine the location of UEs 101, and may cause the communication module 201 to send a notification that a particular asset is out of a range specified range from a predetermined location or undetectable. If the monitoring or tracking information generated by the asset location module 205 indicates that the UE 101 is out of range of the either a receiver or transmitter of the asset location module 205, then the local sensor 103 may interact with the asset location module 205 to alter the visibility of the local sensor. In one embodiment, the change of profile is triggered after the local sensor 103 has been out of range for a predetermined period of time. In another embodiment, the profile trigger and/or the predetermined period of time may be based on other contextual information (e.g., time of day, location, date, etc.) associated with the local sensor 103 and/or the item associated with the local sensor 103. For example, if the item associated with the local sensor is a set of car keys, the out-of-range determination may not be triggered if the asset location module 205 determines from contextual information that the user is taking a walk rather than drive. For example, the determination may be made on based on the user obtaining walking directions rather than driving directions in a navigation service. Accordingly, if the asset location module 204 infers that the user is walking and, therefore, may not need to take the car keys during the walk. Therefore, an out-of-range determination by the asset location module 205 would be expected and would not trigger an out of range notification associated with the car keys. It is contemplated that the user, the service provider, network operator, and the like may create policies for selecting and determining when contextual information and how contextual information should influence the asset location module. This information may be stored in the PPS 115 or the information database 113, for example.

If, however, the asset location module 205 determines that the out-of-range determination is valid, the communication module 201 can then interact with the location asset location module 205 to receive any location information associated with the local sensor 103 is transmitted by the UEs 101 detecting the local sensor 103. In one embodiment, the UEs 101 may report any detection or location information to the asset management platform 109, which can then report the location of the UE 101. The asset management platform 109 can, for instance, identify a paired UE 101 by consulting pairing information stored in the information database 113 or the PPS 115.

Next, the asset location module 205 can direct the communication module 201 to present any location information received by the asset location module 205. In one embodiment, this location information is received as a set of location coordinates generated by the other UEs 101, for example. In addition or alternatively, the location information may include the Cell-ID of the UE 101 detecting the local sensor 103. In certain embodiments, the trusted app 107 presents the location information by interacting with other location-based services such as mapping and navigation services. In this way, the trusted app 107 may indicate the location of the local user 103 and then provide navigation instructions to reach the location.

In various embodiments, the asset management platform 109 causes the asset update module 207 to update the determined assets with information available in the PPS 115 which acts as a gateway between information stored in the information database 113, as well as being a source of gathered information based on a user's usage of a particular asset, many assets, internet usage, contact information, preferences, etc. The asset update module 207 may also grant access for a UE 101 to access the PPS 115 to view or edit information available on the PPS 115 without uploading the information to the UE 101.

In various embodiments, the profile update module 209 determines usage of the assets that are assigned to a user and stored in the user's personal cloud. Based on the usage, the profile update module 209 determines a favorite of the UE's 101 and causes the favorite to be so designated. The profile update module 209 will, therefore, update the user's profile stored in the PPS 115 to reflect this change. The profile update manager 209 may also determine appropriate ranges of distances from which the locations of the UE's 101 may vary from expected locations based on historical usage and movement, for example, and store this information in the user's profile. The user may then alter this information to reflect his own personal preferences. The profile update module 209 may also communicate with external sources to determine contact information and update contact information accordingly. The contact information may be organized into groups for easier access by the user.

The contact duplication detection module 211 reviews any incoming contact information and compares the incoming contact information with any pre-existing contact information. The contact duplication detection module 211, if it detects and duplicate entries, may alert the user that a duplicate entry exists and ask the user if the existing entry should be replaced, or simply overwrite a duplicate entry with the updated information. Such preferences may be set in the profile update module 209 by way of the trusted app 107.

Figure 3:
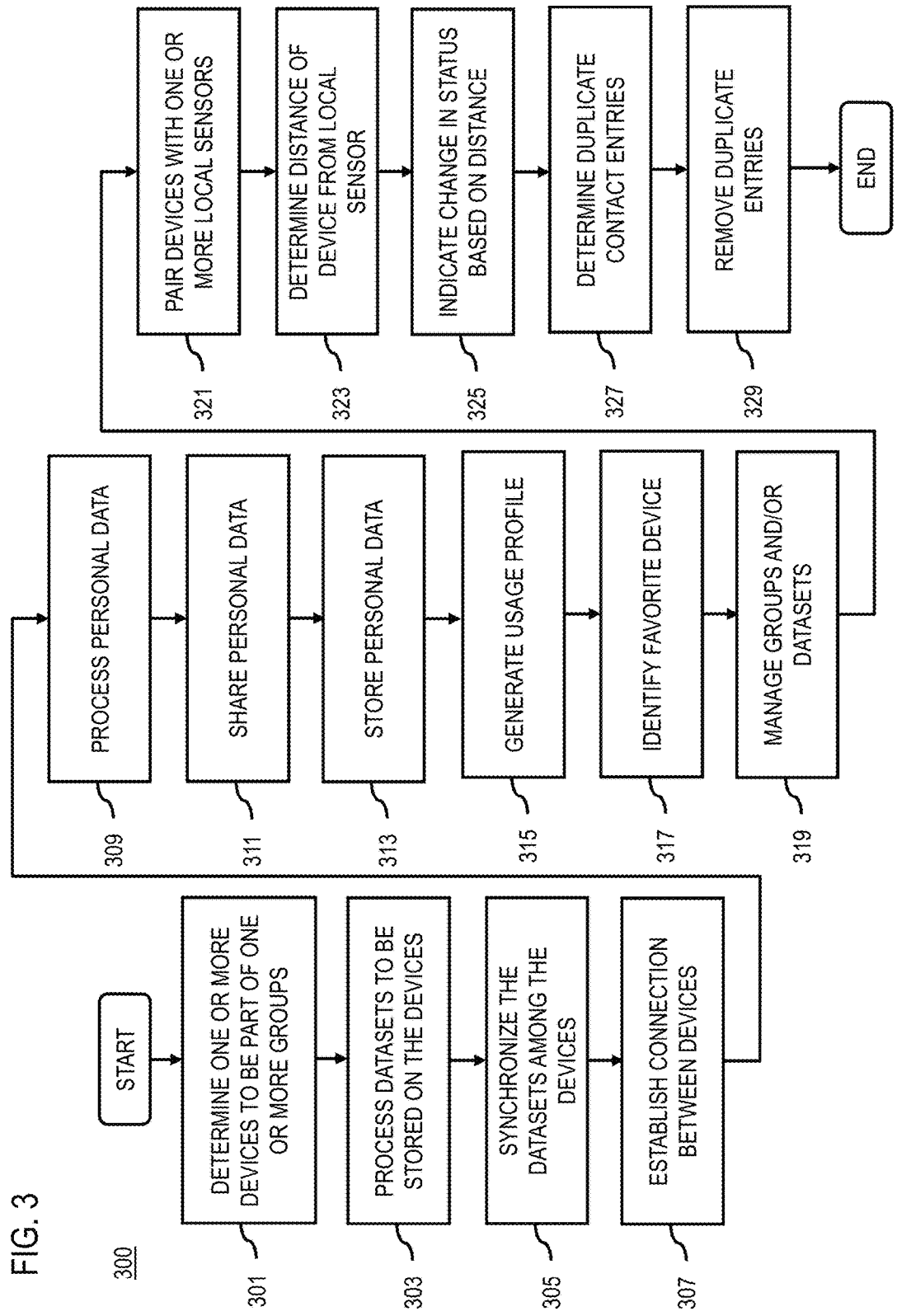
FIG. 3 is a flowchart of a process for creating an inventory of assets and enabling the assets to have access to a central database of information, according to various embodiments.
Figure 14:
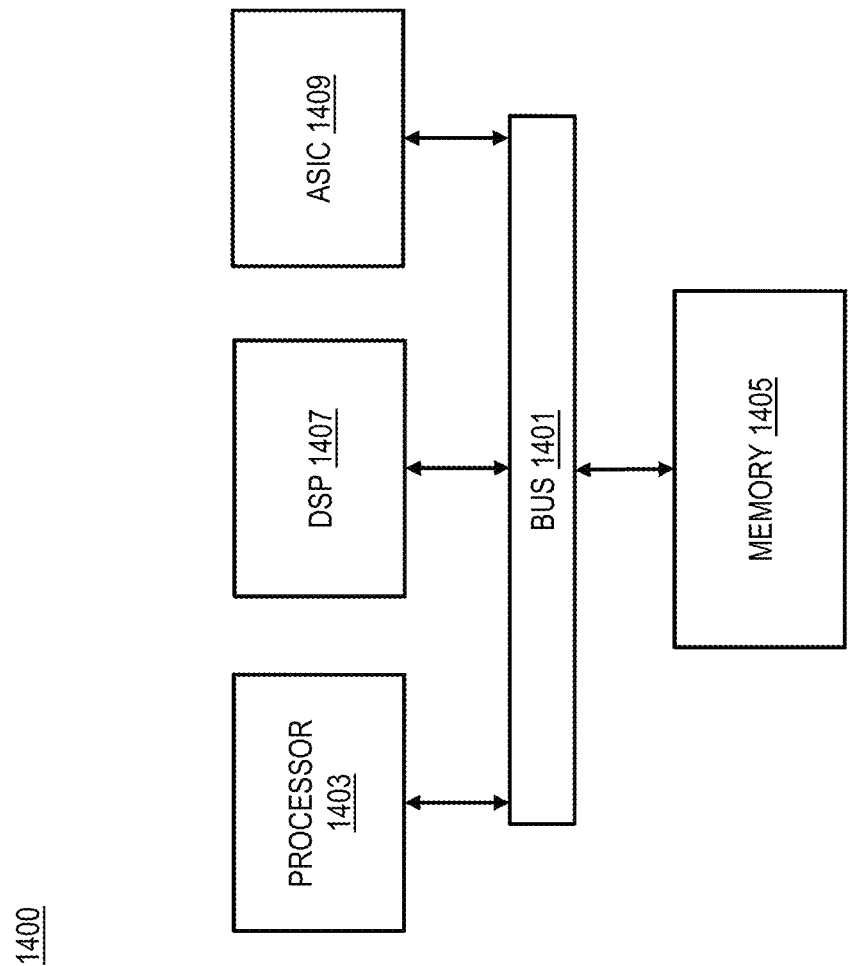
FIG. 14 is a diagram of a chip set that can be used to implement an embodiment of the invention.

FIG. 3 is a flowchart of a process for creating an inventory of assets and enabling the assets to have access to a central database of information, according to one embodiment. In one embodiment, the asset management platform 109 performs the process 300 and is implemented in, for instance, a chip set including a processor and a memory as shown in FIG. 14. It is contemplated that the asset management platform 109 may perform all or a portion of the process 300 alone or in combination with the trusted app 107. In step 301, the asset management platform determines one or more devices to be part of one or more groups. Next, in step 303, the asset management platform determines one or more datasets which may be a contact list or other user preferences or stored information that are to be stored on the one or more devices. The process continues to step 305 in which the asset management platform synchronizes the one or more datasets among the one or more devices that are part of the one or more groups. Then, in step 307, the asset management platform establishes a cryptographic connection between the one or more devices. The process continues to step 309 in which the asset management platform 109 processes personal data regarding the one or more devices that comprises at a date interval of usage, a time interval of usage, a geospatial location, a functional flow, a specific attribute, a speed, and/or a direction of movement. The asset management platform, in step 311 shares this personal data with the one or more devices. Next, in step 313, the asset management platform 109 causes the personal data to be stored as part of the one or more datasets in the PPS 115 and/or the information database 113.

The process continues to step 315 in which the asset management platform 109 uses the personal data to generate a usage profile and/or a map of the one or more devices relative to one another. With this usage profile, in step 317, the asset management platform 109 identifies at least one of the one or more devices to be identified as a favorite device based on the usage profile. Next, in step 319, the asset management platform 109 enables the user to manage the one or more groups and/or the one or more datasets by way of a user interface.

The process continues to step 321 in which the asset management platform 109 pairs at least one of the one or more devices with one or more local sensors. Next, at step 323, the asset management platform 109 determines when the local sensor is beyond a predetermined distance from the device. Then, in step 325, the asset management platform 109 indicates a change in a status of the local sensor based on the determination. The position of the one or more devices with respect to the one or more local sensors is determined based on a short range communication link between the device and the local sensor, and the position of the one or more devices with respect to the one or more local sensors may be determined by triangulating the location of the one or more devices. The process continues to step 327 in which the asset management platform 109 causes an update of the one or more data sets and detects any duplicate data entries in the one or more datasets store on the one or more devices. Then, in step 329, the asset management platform removes the determined duplicate data entries found in the dataset when the one or more datasets are synchronized or updated.

FIGS. 4A-4D are diagrams of user interfaces representing various functional flows for creating an inventory of assets and enabling the assets to have access to a central database of information, according to various embodiments. By way of example, the functional flows correspond to the execution of one or more interface screens for enabling interaction between the user and the asset management platform 109. Particularly, the functional flows pertain to the various means by which a user is able to control the retrieval and/or collection of user profile information within the information space. This includes the means for enabling the user to manage relationships with organizations, select which data to share and which data to conceal, control how data is used by others (e.g., vendors) and for how long, and other functions. In certain embodiments, it is contemplated that the various interfaces may support the establishment or generation of a user profile information record and/or a personal profile stronghold for use over an information space.

FIG. 4A presents an interface for enabling the configuration of personal data by way of manual entry, i.e., as a web-based form. The interface 400 features a firmographic information data entry section 403, which includes various fields for capturing information pertaining to the user's occupational or employer status. For example, the user may select one or more drop down menus to indicate a specific role, industry, location size, organization size, number of locations and headquarters country and state information. Also, an education history data entry section 405 includes various fields for capturing information pertaining to the user's educational background. For example, the user may enter the names of the various schools attended from the Primary to Graduate level. Various other fields are also presented for receiving data regarding the year of graduation as well as the GPA of the user at the various stages of their education. The interface 400 features one or more data sharing control buttons 406a and 406b, which are associated with the firmographic information section 403 and education history section 405 respectively. When the user selects a data sharing control button, a data view 435 (illustrated in FIG. 4D) for enabling user selection of one or more groups and/or contacts to be associated with specific elements of data is caused to be presented as part of the functional flow.

It is noted that the information can be updated (e.g., added or deleted) at the discretion of the user. In addition, one or more action buttons are featured for supporting user interaction, including a "PREV" action button 407 for reverting back to a prior instance of input at various of the fields, an "UPDATE" action button 409 for accepting any data input to the various fields and a "CANCEL" action button 411 for cancelling any data entry operations.

Figure 4B:
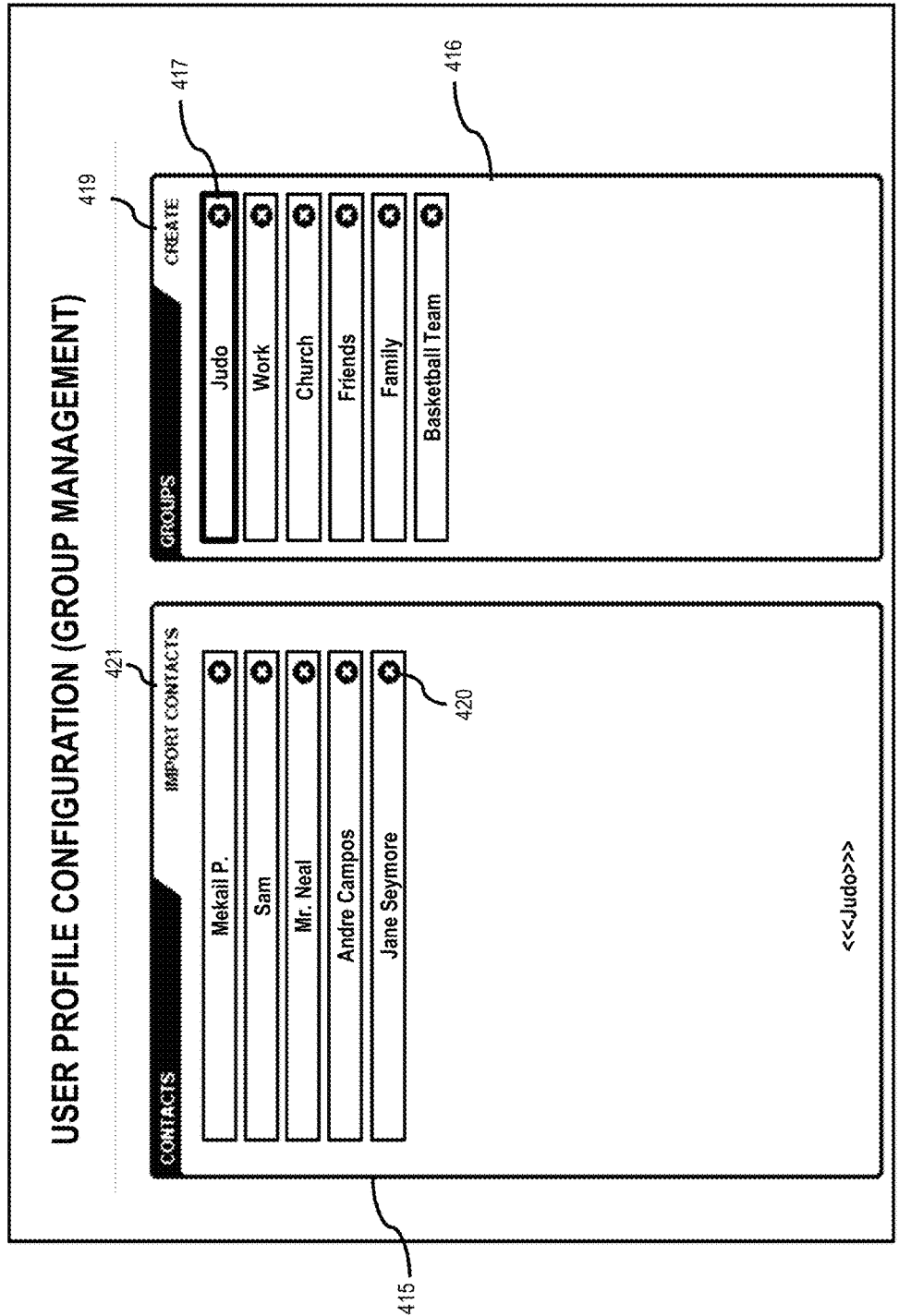

FIG. 4B presents an interface for enabling the configuration and management of group related data related to the user. The interface 414 features a user defined group list section 416. Selection of a particular group also enables selection of an associated contact list 415 for displaying the various contacts associated with the group. By way of example, when the user selects the defined group entry "Judo" 417 from the list 416, the user's martial arts class members are presented in the contacts section 415. The user can also add or delete entries to the lists 417 and 415, such as by selecting a "CREATE" link 419 or selecting a "DELETE" icon 420 respectively.

An "IMPORT CONTACTS" link 421 is also available for selection for enabling the user to import contacts from other sources via the information space. For example, contacts from an e-mail application, customer relationship management tool, online contact database or a social networking site may be imported and organized into one or more groups. Groups and contacts can also be merged and/or synchronized across applications. It is noted that the functional flow supports. The functional flow may also support drag and drop execution of contacts into one or more groups, i.e., by way of touch screen input. As mentioned previously, this input as received from the user may be the basis of one or more computations for affecting additional executions of the asset management platform 109.

Figure 4C:
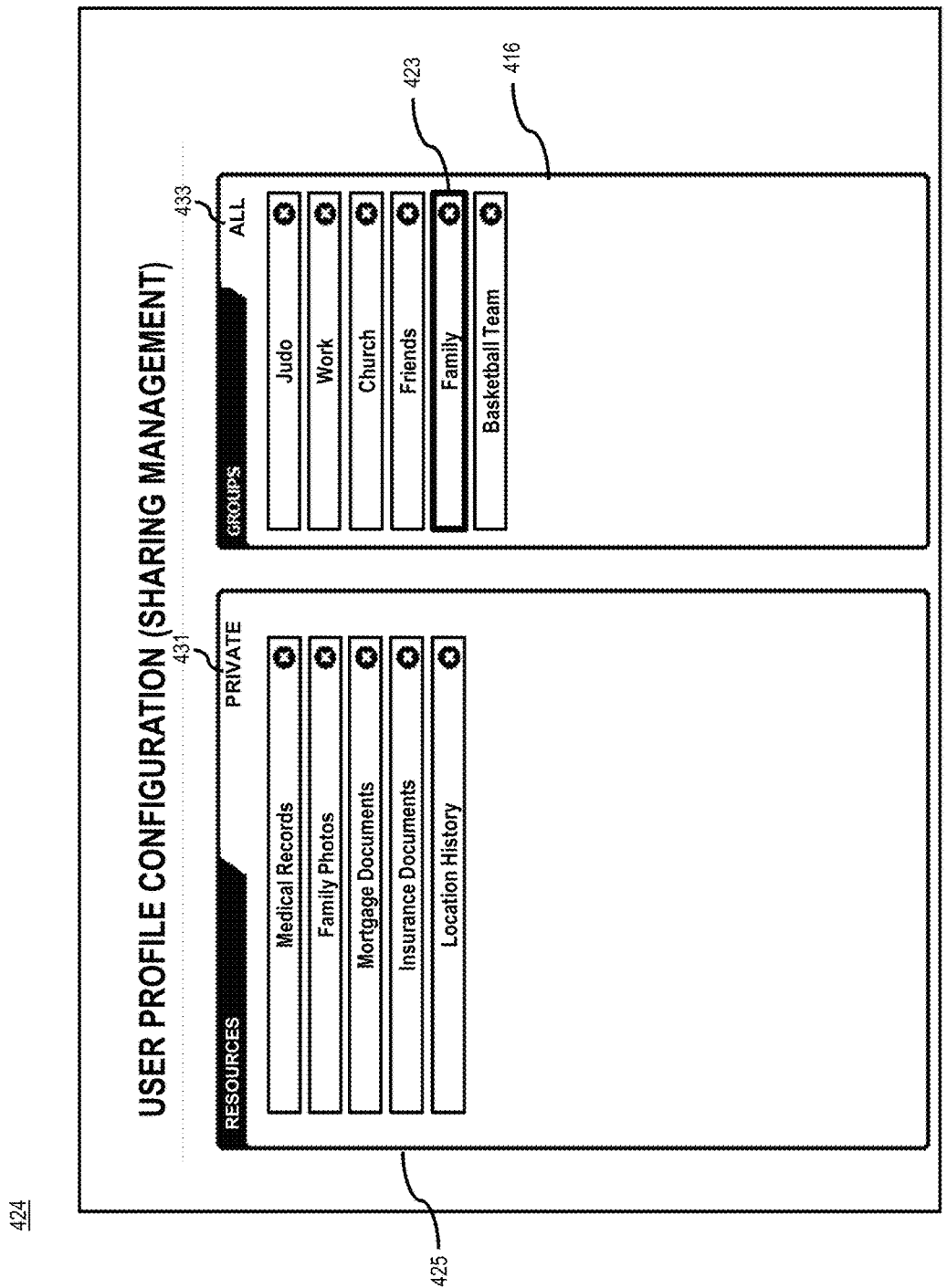

FIG. 4C presents an interface for enabling the configuration and management of shared resources. The interface 424 features a user defined group list 416, along with a resources list 425 for indicating one or more resources associated with a select group entry. By way of example, when the user selects the user defined "Family" group entry 423, all resources associated for that group are listed in section 425. In the example, the resources include various categories for representing the storage of records, documents and photos. While not shown, user selection of a given resource entry results in a listing of the various records, documents and photos. Additional file types may also be maintained as resources, including audio, video and one or more executable applications—i.e., a tax preparation application.

A user may select a "PRIVATE" link 431 to filter the resource list 425 for display of only private resources. In addition, an "ALL" link 433 may be selected for displaying all groups within the group list 416. While not shown, selection of a particular group entry results in a listing of additional information regarding the group. This may include for example, a contact number, e-mail address, primary point of contact, etc. It is noted that drag and drop execution may be supported. Also, the user/consumer is able to customize data packages (for retrieval and/or collection of profile information) on the basis of time, geo-spatial extent, functional flow, specific attribute, etc.

Figure 4D:
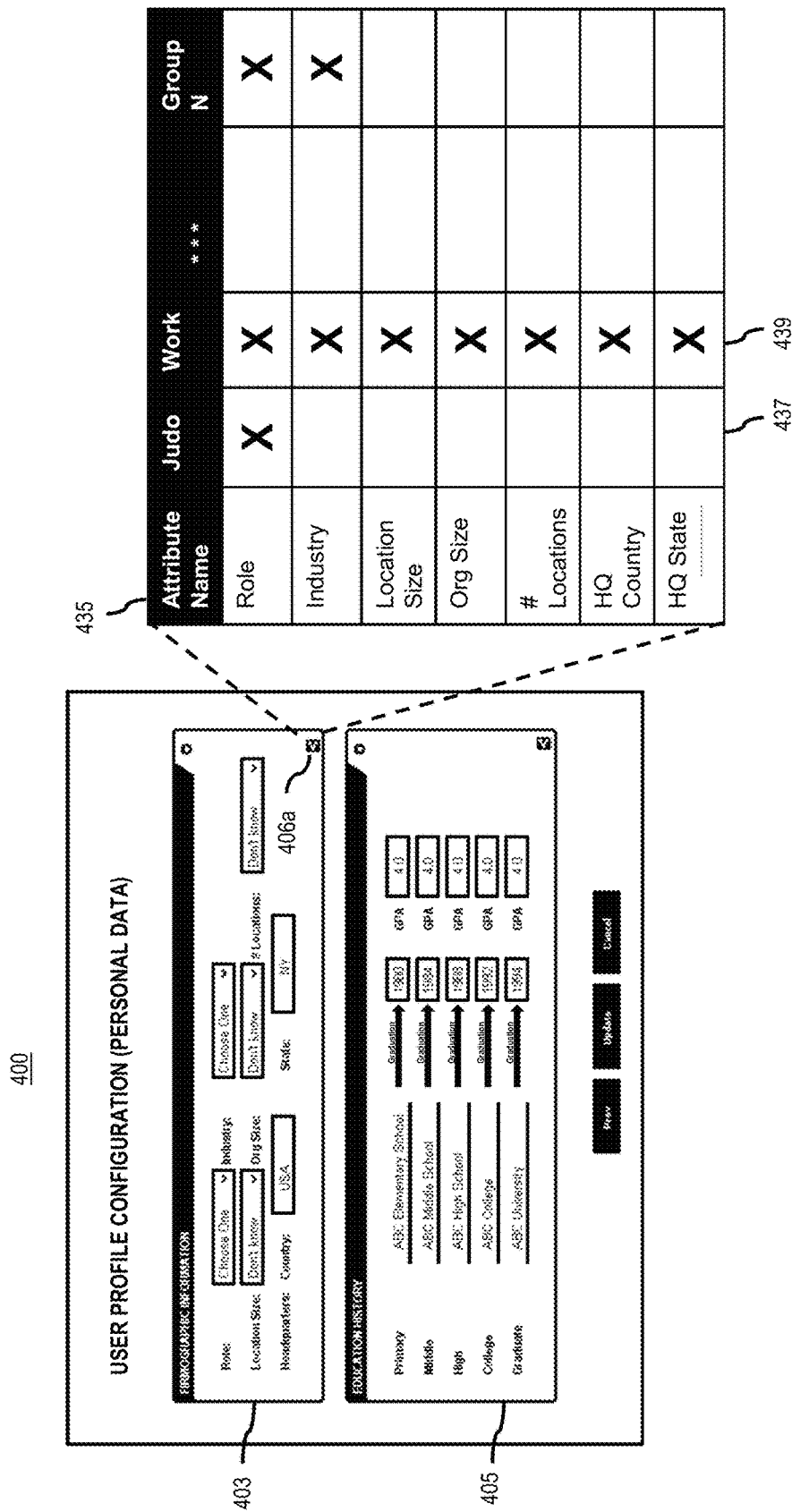

FIG. 4D presents an interface for enabling the configuration of personal data control and updating. Reference is made again to interface 400 of FIG. 4A, which is shown by way of example in miniaturized form in FIG. 4D. The configuration interface 400, as discussed above, features one or more data sharing control buttons 406a and 406b, which are associated with the firmographic information section 403 and education history section 405 respectively. When the user selects a data sharing control button, a data view 435 for enabling user selection of one or more groups and/or contacts to be associated with specific elements of data is caused to be presented as part of the functional flow. By way of example, the data view 435 presents a matrix, featuring numerous columns and rows that represent various data elements (inputs) of the various configuration screens. Under the present scenario, the columns correspond to one or more user defined groups maintained in the group list 16 of FIG. 4B, i.e., Judo, Work, etc. The rows that span across particular column corresponding to a particular attribute name or data entry field of the firmographic section 403. This includes a row for the role, industry, location size, etc.

A user may select or deselect a matrix entry in order to enable or disable the sharing of the corresponding attribute in the matrix with a particular group. For example, for the column 437 representing the Judo group designation, only the role attribute is selected for inclusion and sharing with contacts that fall into this group. For the column 439 representing the Work group designation, however, all of the attributes of the firmographic section 403 are selected for inclusion and sharing with the contacts that fall into this group. This feature may be executed at any point in the functional flow for affecting the sharing or unsharing of specific information within the information space. It is noted also that this feature allows users to easily update their data setting features within context of the specific category of information to be impacted by the selection (or lack thereof).

As mentioned previously, the above described functional flows and corresponding response input provided by a user during execution of said flows dictates the means of data collection and/or level of access to data by respective interacting nodes within the information space. From the standpoint of a vendor related interaction, the user is able to indicate and control how they want to share their user profile information while still engaging with the vendor for specific reasons—i.e., to explore products, make purchases, etc.

Figure 5A:
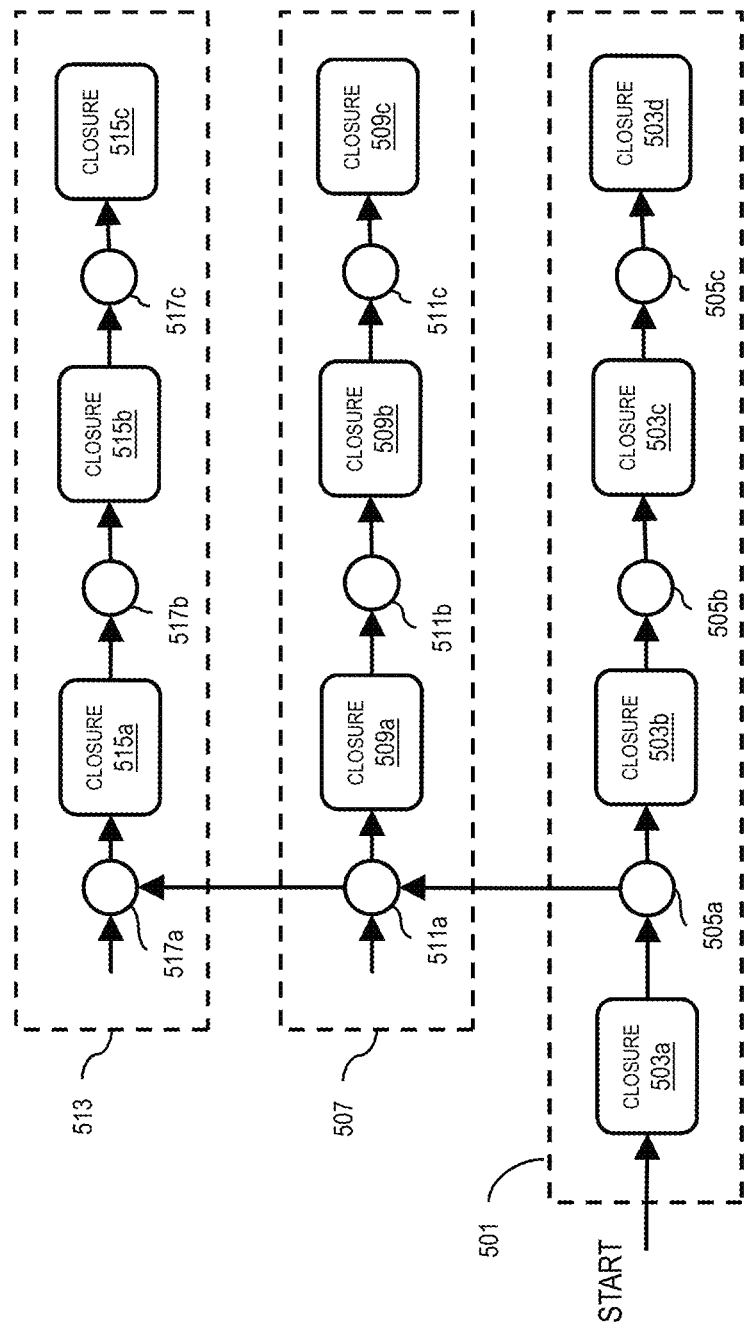

FIGS. 5A and 5B are diagrams of distribution of controlled user profile information and energy optimization in multi-level computational architecture, according to various embodiments. As seen in FIG. 5A, the computation distribution starts at a component 501. Each component may execute a set of closures that constitute a computation branch. For example, the branch 501 is composed of closures 503a-503d, wherein every two consecutive closures are connected via a connector and computational branches are communicating via connectors as well. For example, connectors 505a-505c connect closures 503a-503d. Connectors may also transfer information and data associated with a closure and its execution results to the next closure in the branch or to other branches. Additionally, connectors may function as links between related branches that constitute a distributed computation.

In one embodiment, connectors may contain information about parameters such as security requirement and/or capabilities, functional flows, distribution maps, links between closures and architectural levels, etc. Arrows connecting closures to connectors and connectors to next closures show the functional flow adopted based on the parameters. As seen in FIG. 5A, the closures have been distributed from component 501 to component 507 via communication between connector 505a and connector 511a. The computation branch of component 507 includes closures 509a-509c communicating via connectors 511b and 511c, while branches 501 and 507 communicate via connectors 505a and 511a. Similarly, a third branch 513 has been formed of closures 515a-515c being executed at component 513 and connected by connectors 517b and 517c, while the branch communicates with other branches via connector 517a.

In one embodiment, the initial branch 501 may be in a UE 101, the second branch 507 in a component of the network 105, and the third branch in another component of the same network 105, a different infrastructure, in a cloud, or a combination thereof.

FIG. 5B shows a computation distribution together with various parameters affecting the distribution. As seen in FIG. 5B, the computation distribution starts at a component 531 of an architectural level. Each component may execute a set of closures that constitute a computation branch. For example, the branch 531 is composed of closures 533a-533d, wherein every two consecutive closures are connected via a connector and computational branches are communicating via connectors as well. For example, connectors 535a-535c connect closures 533a-533d and connector 571 connects branches 547 and 559, connectors 551a-551c connect closures 549a-549d connectors 563a-563c connect closures 561a-561d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities including security requirements and availability, a cost function, functional flow specifications, distribution maps, links between closures and architectural levels, etc. Arrows connecting closures to connectors and connectors to next closures show the functional flow adopted based on the parameters. For example, star signs 541a-541d, 557a-557c, and 569a-569b, represent security rules imposed on the closures and the signs 545a-545b represent the security rules imposed on superclosures by the user of UE 101, default by the manufacturer of UEs 101, by the network 105, by the clouds (combination of UEs 101), or a combination thereof, and associated with each closure 533a-533d, 549a-549c, and 561a-561c respectively. Additionally, blocks 539a-539d, 555a-555c, and 567a-567c represent signatures for one or more closures, and blocks 543a-543b represent supersignatures for one or more superclosures. In the example of FIG. 5B, the signature 539a shows the signature for closure 533a based on the rules 541a. In one embodiment, if signature 539a is in accordance with rules 541, the signature is validated and the closure 533a can be distributed, however if signature 539a contradicts any rule of rules 541a, the closure 533a will be identified as invalid by the authentication module 207.

In one embodiment, the block 543a represents a supersignature composed of a set of signatures 539a-539d and block 545a represents combined security rules of component 547 of the multi-level computation architecture. In this embodiment, if the authentication module 207 detects a contradiction between the supersignature 543a and the rules 545a, the super signature 543a is decomposed into its root elements (e.g. 539a-539d) and the authentication module 207 verifies the root signatures against rules 545a. The verification may lead to finding one or more invalid root elements (e.g. closures 539a-539d).

In one embodiment, a closure or a group of closures may lack access to security rules for the verification of their signatures. For example, in FIG. 5B the closure 561c is signed with signature 567c with no rules. In this embodiment as seen by arrow 573, the authentication module 207 may tag the closure 561c as invalid so that the distributed computation component that is executing branch 559 bypass the closure 561c without executing the computation 561c. The final results from closure execution of the three branches 531, 547, and 559 are aggregated by result aggregator 575 and forwarded to the requesting device.

Figure 6A:
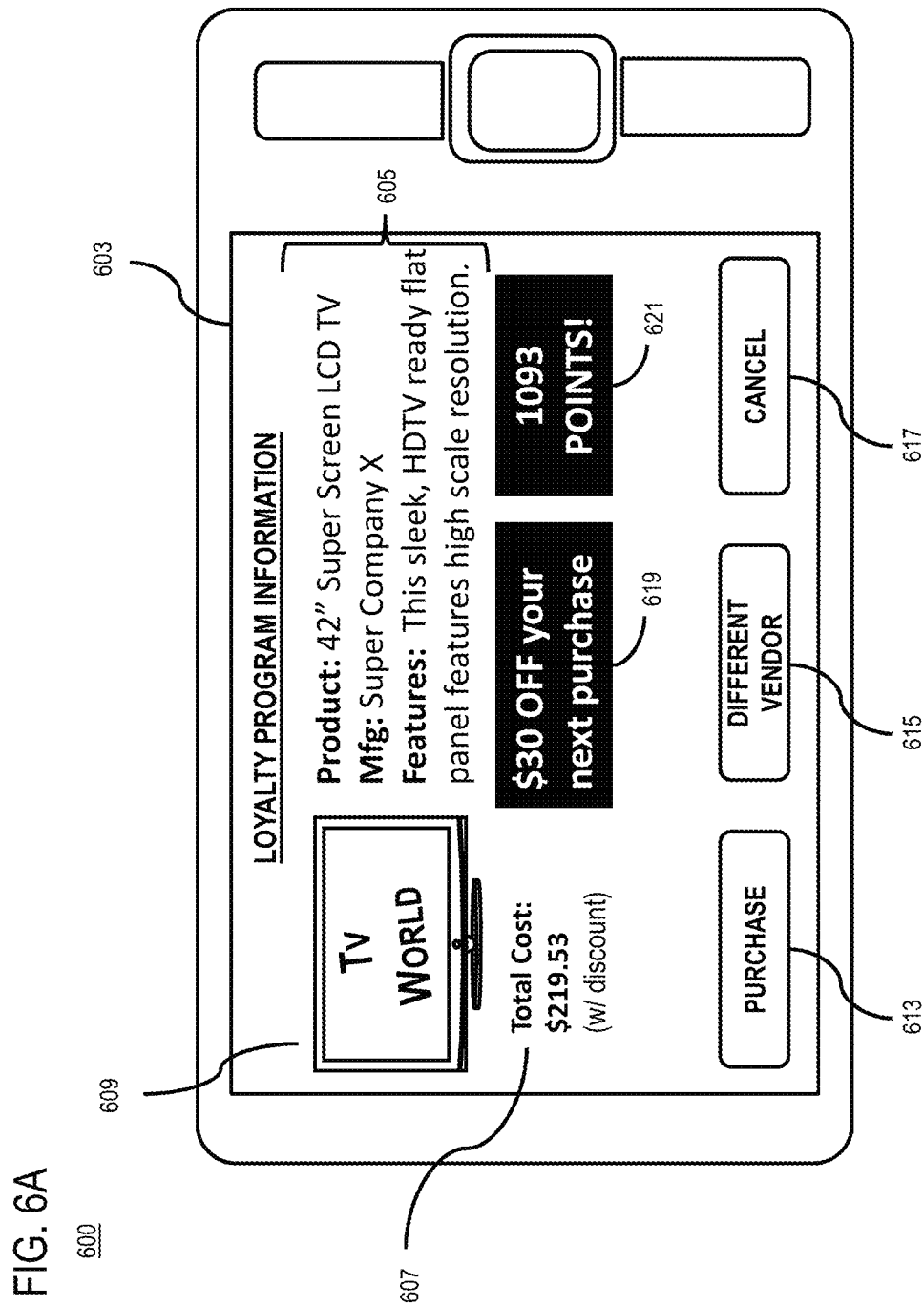
FIGS. 6A-6C are diagrams of user interfaces utilized in the processes of FIG. 3, according to various embodiments.
Figure 6B:
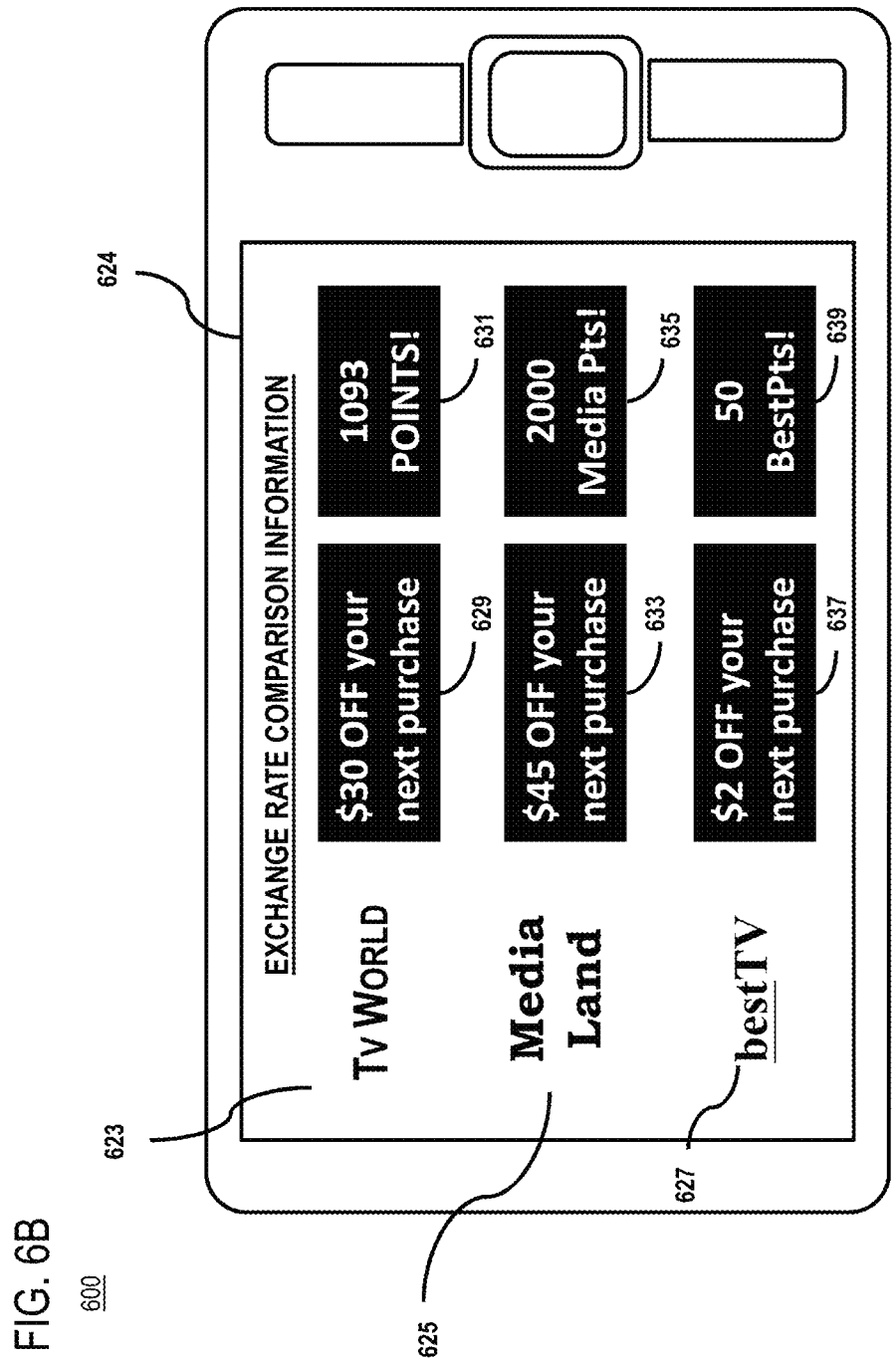
Figure 6C:
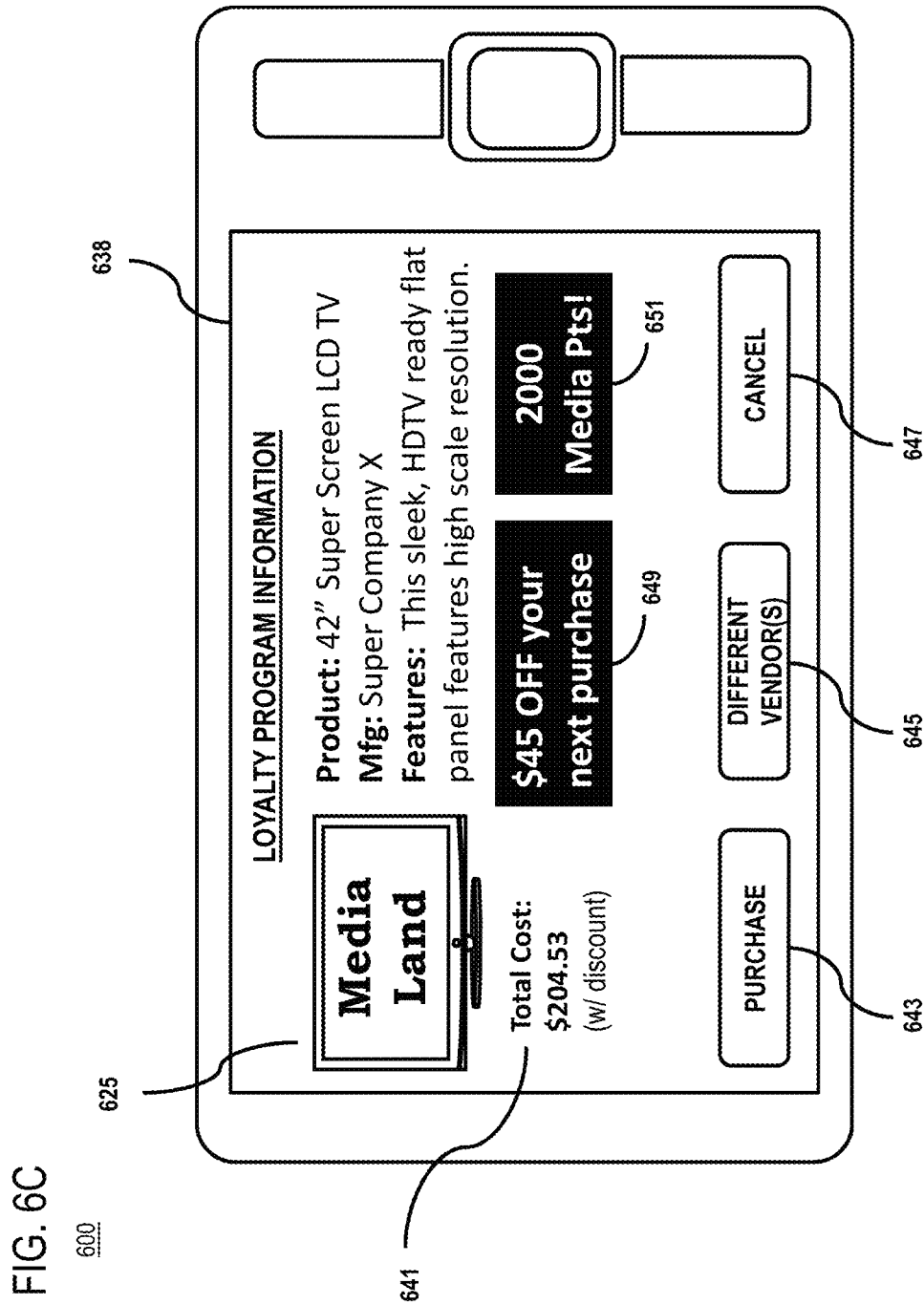

FIGS. 6A-6C are diagrams of user interfaces utilized in the processes of FIG. 3, according to various embodiments. For example purposes, the figures are described from the perspective of a use case scenario of a user interacting with a vendor via an information space to review various loyalty program incentives, offers and points as accumulated. The executions as described are performed with respect to the asset management platform 109 of FIG. 1.

In FIG. 6A, the user accesses data regarding their loyalty program involvement with a specific vendor TV World, such as by way of a loyalty program information interface 603. The display of the device 600 includes various data elements, including an icon 609 for indicating the specific vendor the loyalty information corresponds to, a product description section 605 for displaying details of the offer and/or product, a total cost notification 607 for indicating the post discounted cost to the user for taking advantage of a particular offer, a value indicator 619 for monetizing the offer and a loyalty points indicator 621 for representing the balance of points accumulated.

The user may select from various action buttons for interacting with the functional flow, and thus impacting operation of the asset management platform 109. A "PURCHASE" action button 613 enables the user to initiate a purchase transaction with the vendor for purchasing the item from TV World. A "CANCEL" action button 617 enables the user to exit from the loyalty program information interface 603. When the user selects a "DIFFERENT VENDOR" action button 615, an exchange rate comparison interface 624 is caused to be presented to device 600 as shown in FIG. 6B.

The exchange rate comparison interface 624 presents all of the various vendors 623-627 and their respective offers available to the user based on the product of interest, i.e., the television as described in section 605 in FIG. 6A. For a first vendor TV World 623, the user is being offered a $30 discount 629 to be applied toward the purchase of the television, which corresponds to 1093 points 631. For a second vendor Media Land, the user is being offered a $45 discount 633 corresponding to 2000 Media Points 635, which is the name given to points via that vendors loyalty program. A third vendor bestTV 627 offers a $2 discount 637 corresponding to only 50 Best Points 639. The user may quickly scan the various options and determine that the Media Land incentive is best by way of comparison. In response to this determination, the user selects the Media Land logo to activate another interface screen 638 for showing the details of the selected offer, as presented in FIG. 6C.

Having selected the particular offer of interest, the details presented to the interface 638 of the device include the logo for the vendor 625, a total cost indicator respective to the newly selected vendor/offer 641, the monetary value indicator 649 for the offer, associated loyalty points balance 651. In addition, one or more action buttons 643-647 enable the user to facilitate a purchase, select a different vendor or cancel the interaction altogether.

It is noted that vendors, retailers and the like often have loyalty plans designed to bring consumers back to the their retail stores by giving them incentives in the form of (1) cash back, (2) points that can be used for discounts, or (3) coupons. The above described system 100 of FIG. 1 provides a personalized, secure platform for enabling selective engagement with vendors that performs the following:
 1. Enables the user/consumer to keep track of all value earned in terms of points;
 2. Analyzes the consumer's profile information for enabling processing and generation of one or more computations within the information space;
 3. Based on the user profile information and loyalty program information, the system identifies and pulls the vendor's best deals that are relevant for their consumer;
 4. Enables the consumer to visually review the points, incentives and offers gathered,
 5. Enables the consumer to exchange vendor specific points by way of an exchange mechanism for other vendor points; comparative value calculations are performed for arbitration and reconciliation purposes.

In effect, the user is able to redeem and use loyalty points across vendors within the within the cloud. Of note, the loyalty points accumulated by a respective user may pertain to one or more of the respective vendors, a provider of the asset management platform 109 (e.g., a wireless communication company), or a combination thereof. The vendor loyalty program may be a basis for sharing information from the PPS 115 with the UEs 101 of the system 100. When a user's assets or devices are determined to be part of the user's personal cloud, the user may decide what information is to be shared and updated among its devices. As such, the vendor will have access to those devices that are determined to be part of the cloud and those that the user decides to share his information such as device usage, location, ownership, etc. with. When the user, by way of trusted app 107, decides to allow access to the devices, and allow the devices to be updated and/or have access to the PPS information, a vendor may also then have the ability to access any shared information that the user allows.

Figure 7A:
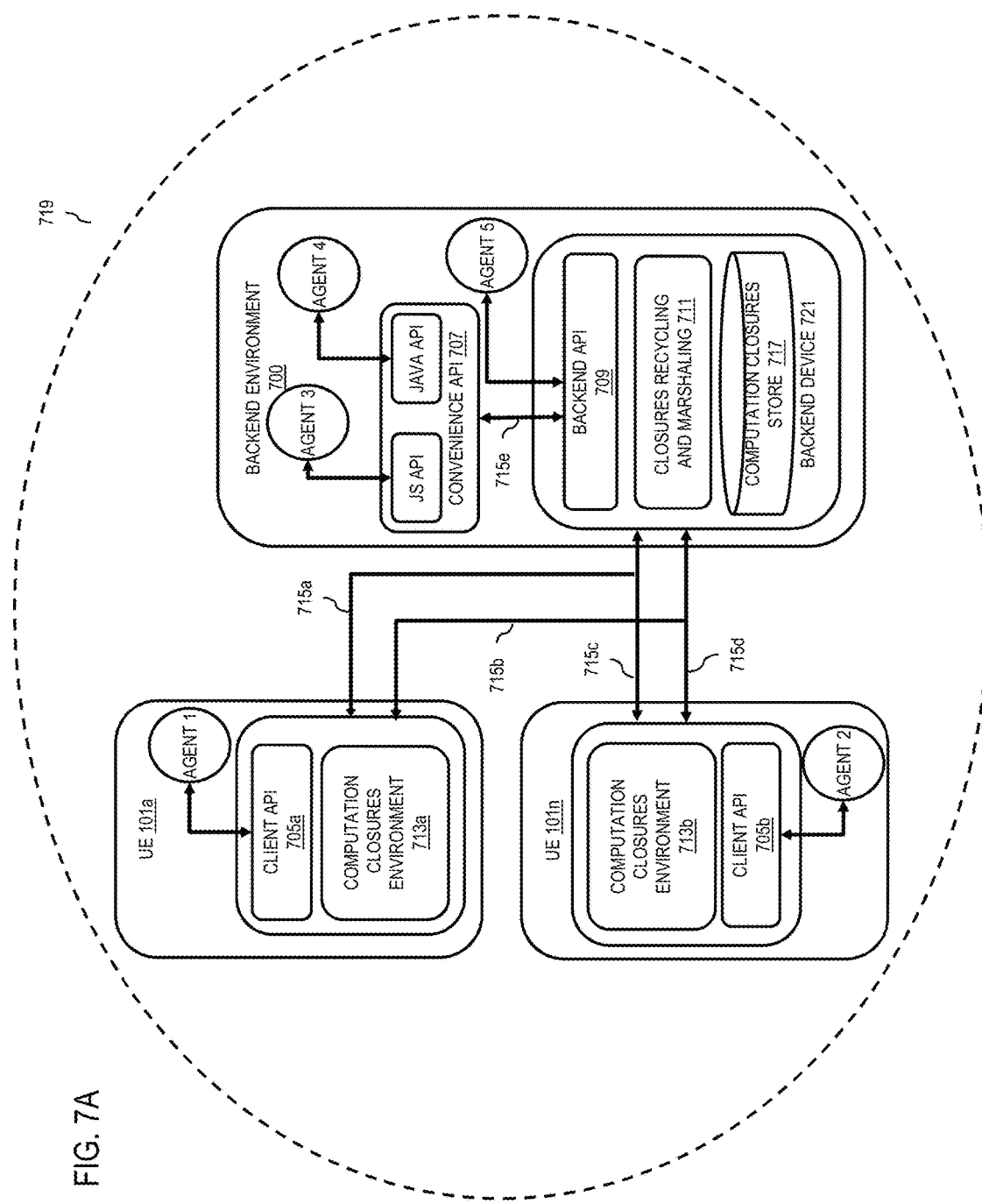
FIGS. 7A-7B are diagrams of computation distribution among devices, according to various embodiments.
Figure 7B:
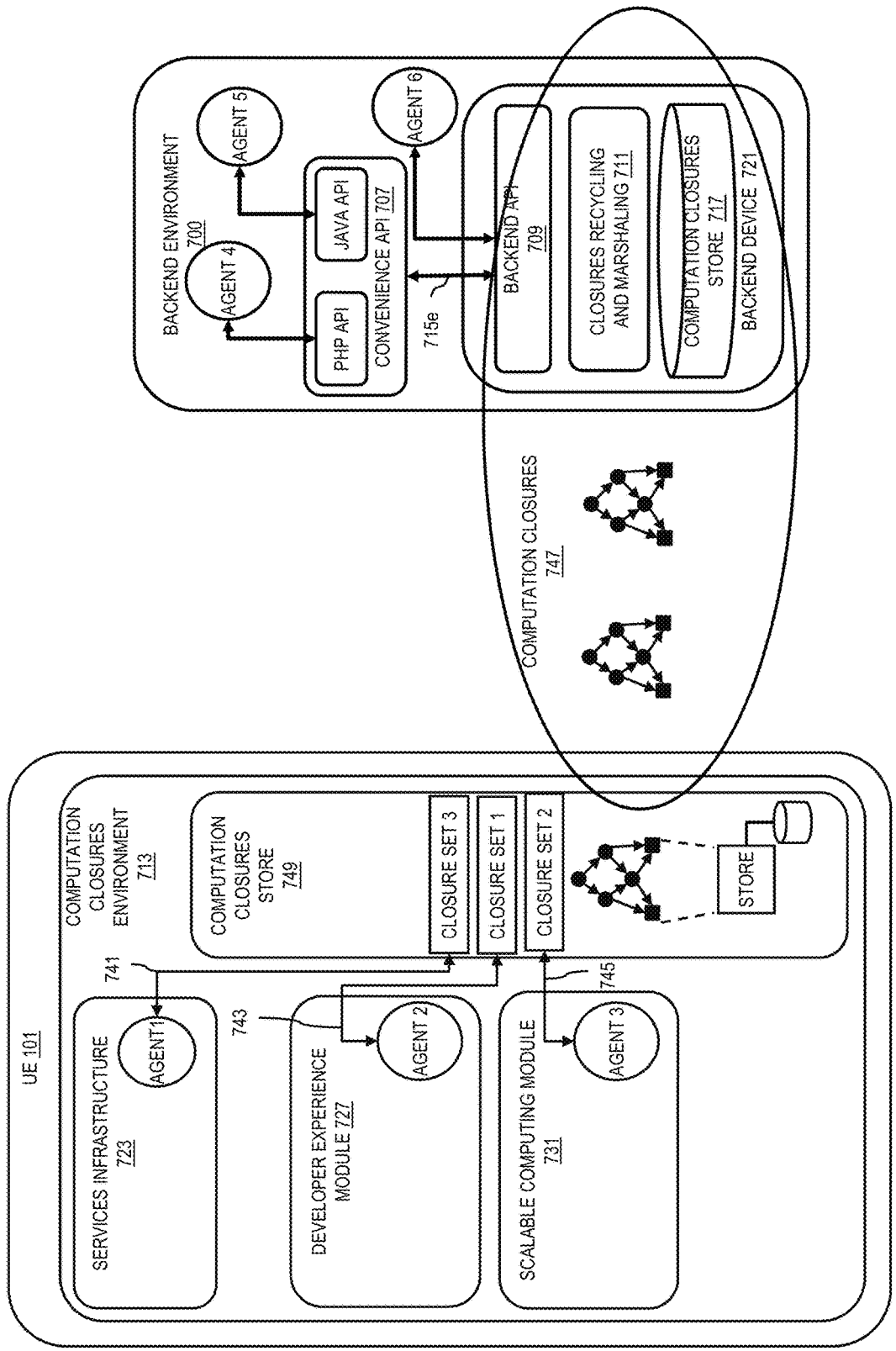

FIGS. 7A-7B are diagrams of computation distribution among devices, according to various embodiments. In one embodiment, in FIG. 7A, the backend environment 700 is a network infrastructure. The backend environment may also be a virtual run-time environment within a cloud 719 associated with the owner of UE 101a or on another UE 101n associated with the user. The backend environment 700 may include one or more components (backend devices) 721 and one or more Application Programming Interface (API) such as a convenience API 707 that may include APIs tailored to the software development environments used (e.g. JAVA, PHP, etc.). Furthermore, UEs 101a and 101n may include client APIs 705a and 705b. Each API enables interaction between devices and components within another device or an environment. For example, backend API 709 enables interaction between the backend device 721 and Agent5, and convenience API 707 enables interaction between the backend device 721 and agents Agent3 and Agent4, wherein each agent is a set of processes that handle computation closures within the backend environment 700. APIs 705a and 705b enable interaction between UE 101a and agent Agent1, and UE 101n and agent Agent2 respectively. As seen in the example of FIG. 7A, Agent3 works under PHP while Agent4 is a JAVA process. Each of the UEs 101a and 101n has a computation closure environment 713a and 713b which may be part of a cloud 719. Arrows 715a-715e represent distribution path of computation closures among the environments 713a, 713b and the computation closures store 717. The computation closures store 717 is a repository of computation closures that can be accessed and used by all the UEs 101 and infrastructure components having connectivity to the backend environment 700.

In one embodiment, the backend device 721 may be equipped with a closure recycling and marshaling component 711 that monitors and manages any access to the computation closures store 717. In other embodiments the closure recycling and marshaling (i.e. standardization for uniform use) may be a function of the asset management platform 109.

In one embodiment, the computation closures within environments 713a, 713b and the computation closures store 717 may be composed based on anonymous function objects and automatically created by a compiling system using methods for generating anonymous function objects such as lambda expressions.

FIG. 7B is an expanded view of a computation closure environment 713 as introduced in FIG. 7A. The computation closure environment 713 may be composed of one or more computation closure generating components. In one embodiment the computation closure environment 713 has a services infrastructure 723 that provides various services for the user of the UE 101. The services may include any application that can be performed on the UE 101 such as, games, music, text messaging, voice calls, etc. In one embodiment, the services infrastructure 723 provides support for closure distribution under the supervision of the asset management platform 109 as discussed in FIG. 1, FIG. 2, and FIG. 3. The agent Agent1 retrieves the computation closures required by the services infrastructure 723 from the computation closures store 749 and stores the newly generated computation closures by the services infrastructure 723 into the computation closures store 749 for distribution purposes per arrow 741.

In another embodiment, the computation closure environment 713 has a developer experience module 727 that provides various tools for a developer for manipulating services offered by the UE 101. The tools may include standardized and/or abstract data types and services allowing the developers to chain processes together across development platforms. In one embodiment, the developer experience module 727 provides cross platform support for abstract data types and services under the supervision of the asset management platform 109 as discussed in FIG. 1. The agent Agent2 retrieves the computation closures required by the developer experience module 727 from the computation closures store 749 and stores the newly generated computation closures by the developer experience module 727 into the computation closures store 749 for distribution purposes per arrow 743.

In yet another embodiment, the computation closure environment 713 has a scalable computing module 731 that provides an abstract wrapper (i.e. monadic wrapper) for the transmitting closures 501. This abstraction provides computation compatibility between the closures 501 and the UE 101. The abstract wrapper may provide scheduling, memory management, system calls and other services for various processes associated with the closures 501. These services are provided under the supervision of the asset management platform 109 as discussed in FIG. 1. The agent Agent3 retrieves the computation closures required by the scalable computing module 731 from the computation closures store 749 and stores the newly generated computation closures by the scalable computing module 731 into the computation closures store 749 for distribution purposes per arrow 745. In one embodiment, the backend environment 700 may access the computation closures store 749 and exchange/transmit one or more computer closures 747 between the computation closures store 749 and the backend computation closures store 717.

Figure 8:
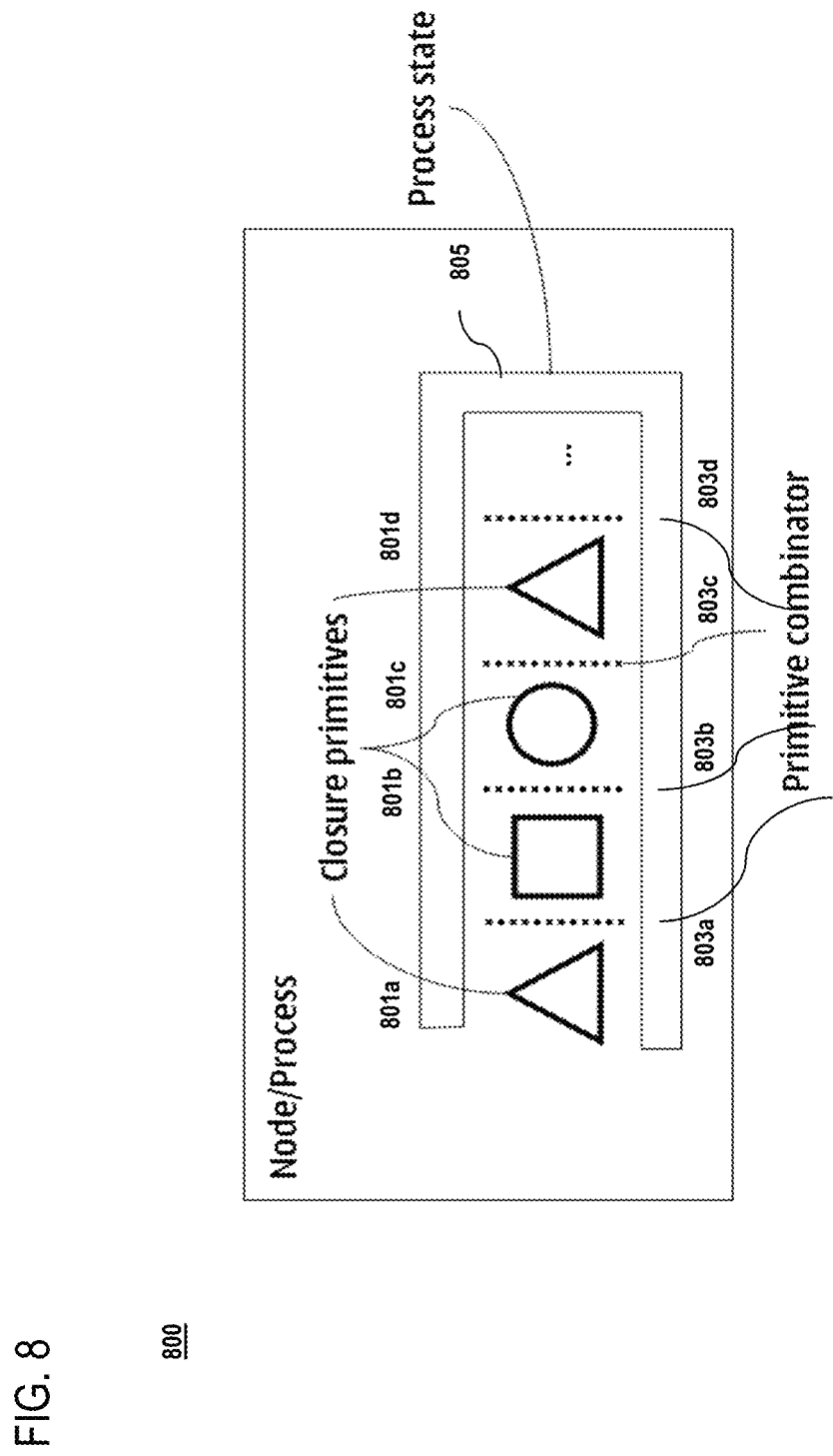
FIG. 8 is a diagram showing a process as a combination of primitive computation closures, according to one embodiment.

FIG. 8 is a diagram showing a process as a combination of primitive computation closures, according to one embodiment. Process 800 consists of closure primitives 801a-801d. The closure primitives 801a-801d, which are similar to geometric icon closures of FIG. 5, are combined with each other into process 800 by combinators 803a-803d. The object 805 represents the execution requirements including process states under which the execution of closures 801a-801d combined by combinators 803a-803d will result in the process 800.

In one embodiment, distribution of process 800 includes distribution of closures 801a-801d, combinators 803a-803d and the process states 805 as independent elements into, for instance, an infrastructure environment 700. The independent closures 801a-801d from infrastructure environment 700 may be distributed into different components where they may be executed.

Figure 9:
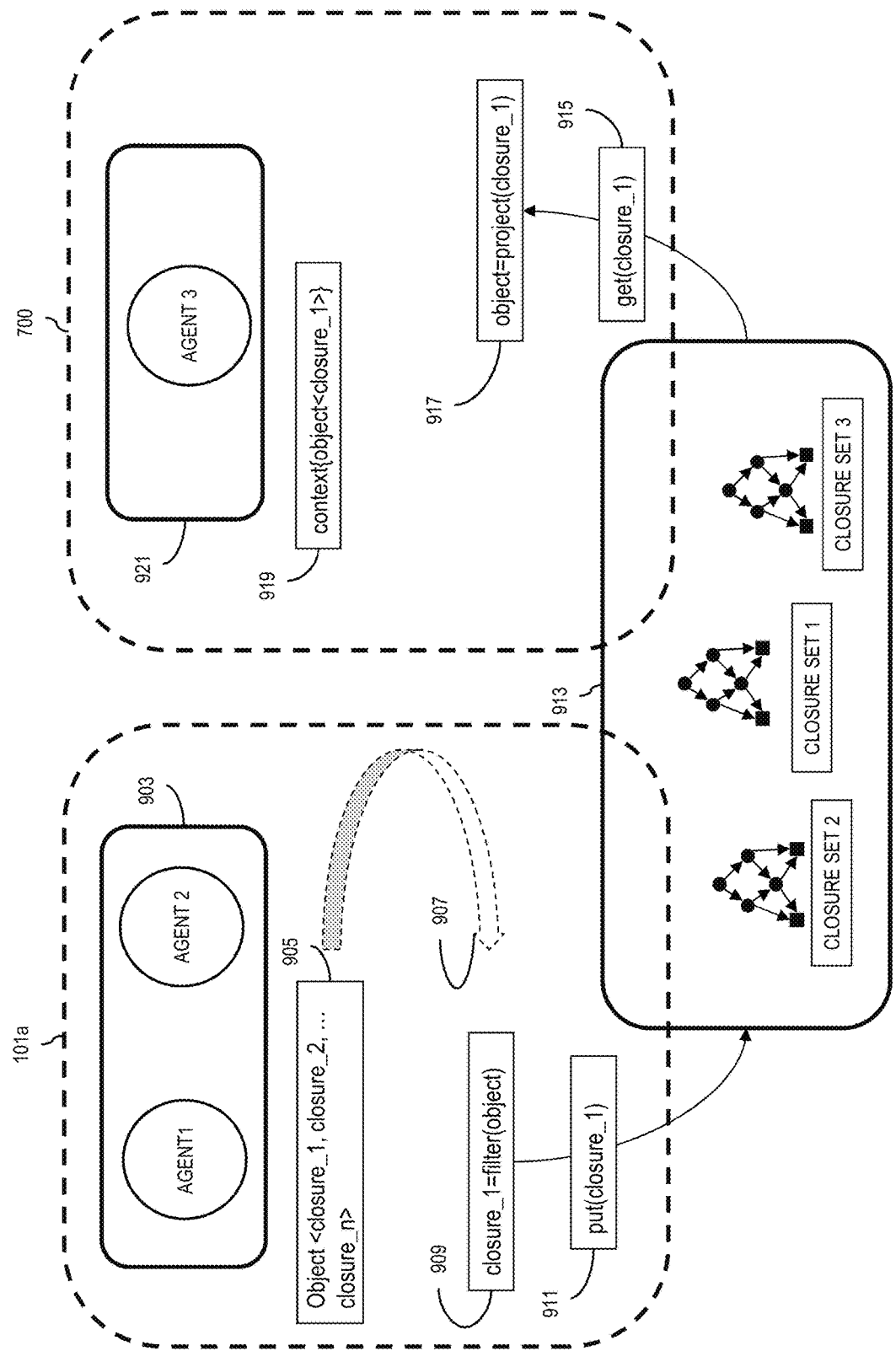
FIG. 9 is a diagram of process distribution from a device to another device, according to one embodiment.

FIG. 9 is a diagram of process distribution from a device to another device, according to one embodiment. In one embodiment, the device 101a is a UE associated with the user. The UE 101a may include a user context 903 which is being transmitted among devices. Agent1 and agent2 are processors that calculate and handle computation closures within the user context 903. The number of agents may be different in different devices based on their design, functionality, processing power, etc. Block 905 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 9, the filtering process 907 extracts closure_1 from the closure set Object via filtering the set (shown in block 909). The extracted closure_1 is added to a computation closure store 913 using the exemplary Put command 911.

It is assumed, in this example, that component 700 of an infrastructure level is selected by the asset management platform 109 as a destination for closure distribution from UE 101a, based on the availability of sufficient security. The extracted computation closure, closure_1 is transmitted to component 700 following the assignment of a distribution path.

In one embodiment, the component 700 receives the computation closure closure_1 and extracts it from the computation closure store 913 using the Get command 915. The extracted closure_1 is projected into a closure with the user device context and the object 917 is produced. The block 919 represents the reconstruction of the closure into the initial context by a component in charge of the execution. The aggregated context may then be executed in the runtime environment 921 of component 700 by Agent3.

In another embodiment, the UE 101a and component 700 may exchange places and the distribution is performed from the component 700 to UE 101a or both devices may be UEs. In this embodiment the decomposition and aggregation processes are similar to the above example.

Figure 10:
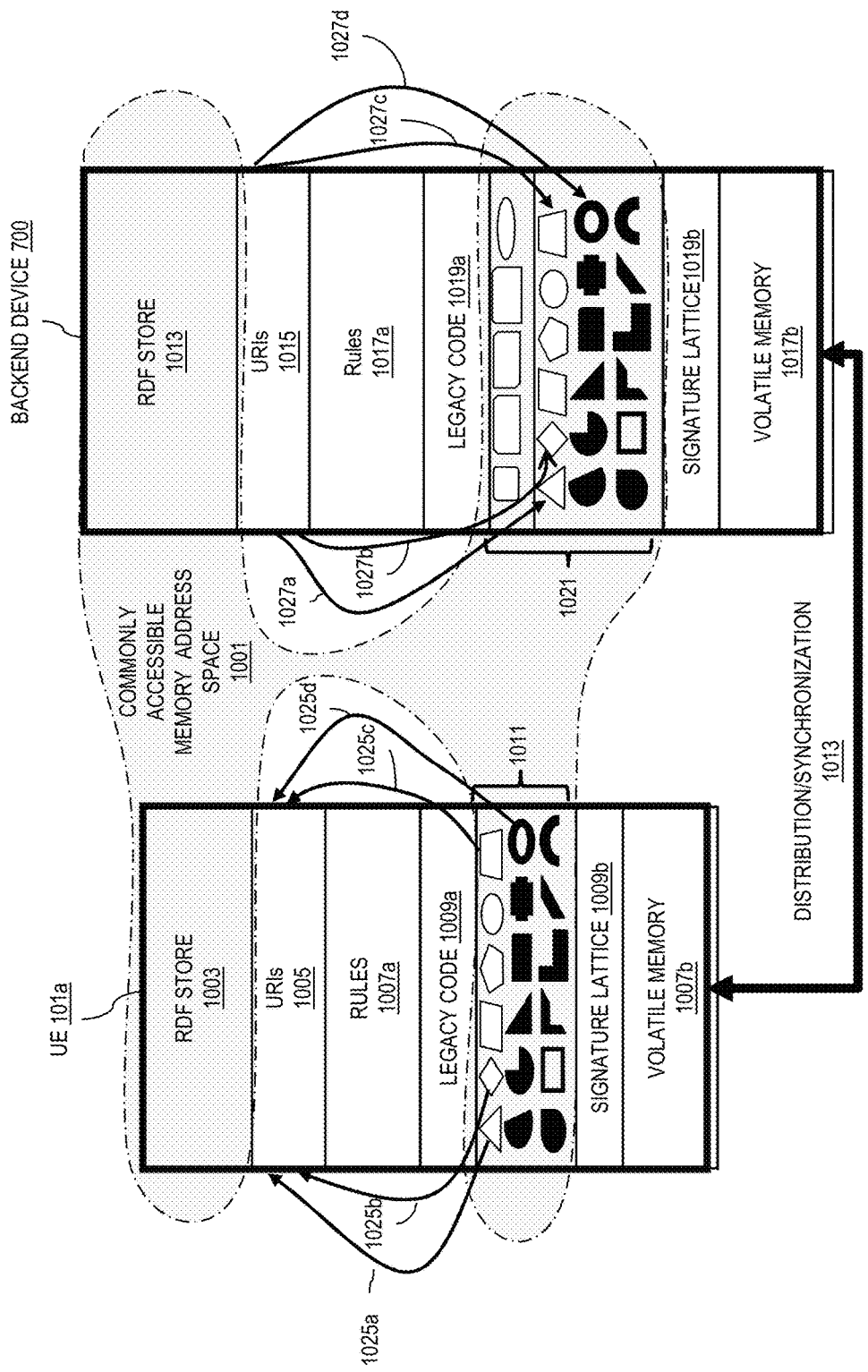
FIG. 10 is a diagram of computation closure allocation/mapping, according to one embodiment.

FIG. 10 is a diagram of computation closure allocation/mapping, according to one embodiment. The diagram of FIG. 10 shows a commonly accessible memory address space 1001 formed between a UE 101a as a client and the backend device 700 as a component of a computation infrastructure.

In one embodiment, the UE 101a may include RDF store 1003, which holds computation closures for processes associated with the UE 101a. Similarly the backend device 700 may includes a RDF store 1013, which holds computation closures associated with processes related to device 700, UEs 101, or any other devices having connectivity to device 700 or cloud 719.

In other embodiments, the Uniform Resource Identifiers (URIs) 1005 in UE 101a and 1015 in backend device 700 may be used to identify names or resources accessible to their respective devices via the communication network 105. Additionally, UE 101a and backend device 700 may have rule sets 1007a and 1017a that include security rules imposed on device similar to rules 569a-569b of FIG. 5B. It is noted that the rule base 1007a of UE 101a may be a subset of the rule base 1017a of the backend device 700, wherein the rules 1017a is a subset of a superset of rules managed by a cloud 719. Furthermore, the legacy codes and signature lattices associated with each device may be stored in legacy code memory areas 1009a and 1009b, respectively, on UE 101a and 1019a and 1019b, respectively, on backend device 700.

In one embodiment, UE 101a may be provided with a non-volatile memory space 1011 as a closure store. The closure store 1011 may include a set of closure primitives shown as geometric objects, similar to primitives of sets 801 or 803 of FIG. 8. Similarly, the backend device 800 may be provided with a non-volatile memory space 1021 as a closure store. The closure store 1021 may also include a set of closure primitives shown as geometric objects. In one embodiment, the closure store 1011 is a subset of closure store 1021 determined, at least in part, based on one or more criteria such as time of access, frequency of access, a priority classification, security settings, etc. The geometric shapes of closure stores 1011 and 1021 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 1007a, 1007b, 1017a, and 1017b), the capacity of non-volatile memory on a UE 101 is limited. However, a backend device 700, serving high numbers of users, may be equipped with larger volumes of non-volatile memory spaces. Because of the limited capacity of non-volatile memory spaces on UEs 101, and also because differing levels of security setup on various devices, only a subset of the closure store 1021 is stored locally at the closure store 1011 for local use by the UE 101a. In order to minimize the number of times a UE 101 needs to retrieve one or more primitives from closure store 1021 of UE 101, the subset 1011 is determined based on one or more criteria. In one embodiment, the closure store 1011 may be determined as a set of the most frequently accessed closure primitives of closure store 1021 by UE 101. In another embodiment, the closure store 1011 may be determined as a set of the most recently accessed closure primitives of closure store 1021 by UE 101. In other embodiments, various combined conditions and criteria may be used for determining subset 1011 from set 1021 as the content of closure store for UE 101. Furthermore, the closure stores 1011 and 1021 may be periodically synchronized. The synchronization of closure stores ensures that any changes (addition, deletion, modification, etc.) in closure primitives and in root elements of the signature lattice of closure store 1021 are reflected in the closure store 1011.

In one embodiment, for execution of a closure set 801 (a subset of closure store 1011) associated with a process on UE 101, the set 801 can be transmitted under the supervision of the asset management platform 109 and after verification of the security of closures and capabilities of the destination component, to the backend device 700 which is a component of the infrastructure (the distribution path shown as arrow 1023). The asset management platform 109 may then inform the processing components of the UE 101, the backend device 700 or a combination thereof (the processing components are not shown), that the security of closure primitives has been approved and the closures are ready for execution. Alternatively, the asset management platform 109 may determine that the closures are not approved from point of view of the security and terminate their distribution and execution.

In one embodiment, any changes on the closure store 1021 of the backend device 700 (e.g., addition, deletion, modification, etc.) may first enter the URIs 1015 via the communication network 105. The changes may then be applied from URIs 1015 on closure store 1021 shown by arrows 1027a-1027d. Similarly, the closure store 1011 is updated based on the content of the closure store 1021 and the updates are shared with other authorized components within UE 101 (e.g. with URIs 1005 as shown by arrows 1025a-1025d).

Figure 11A:
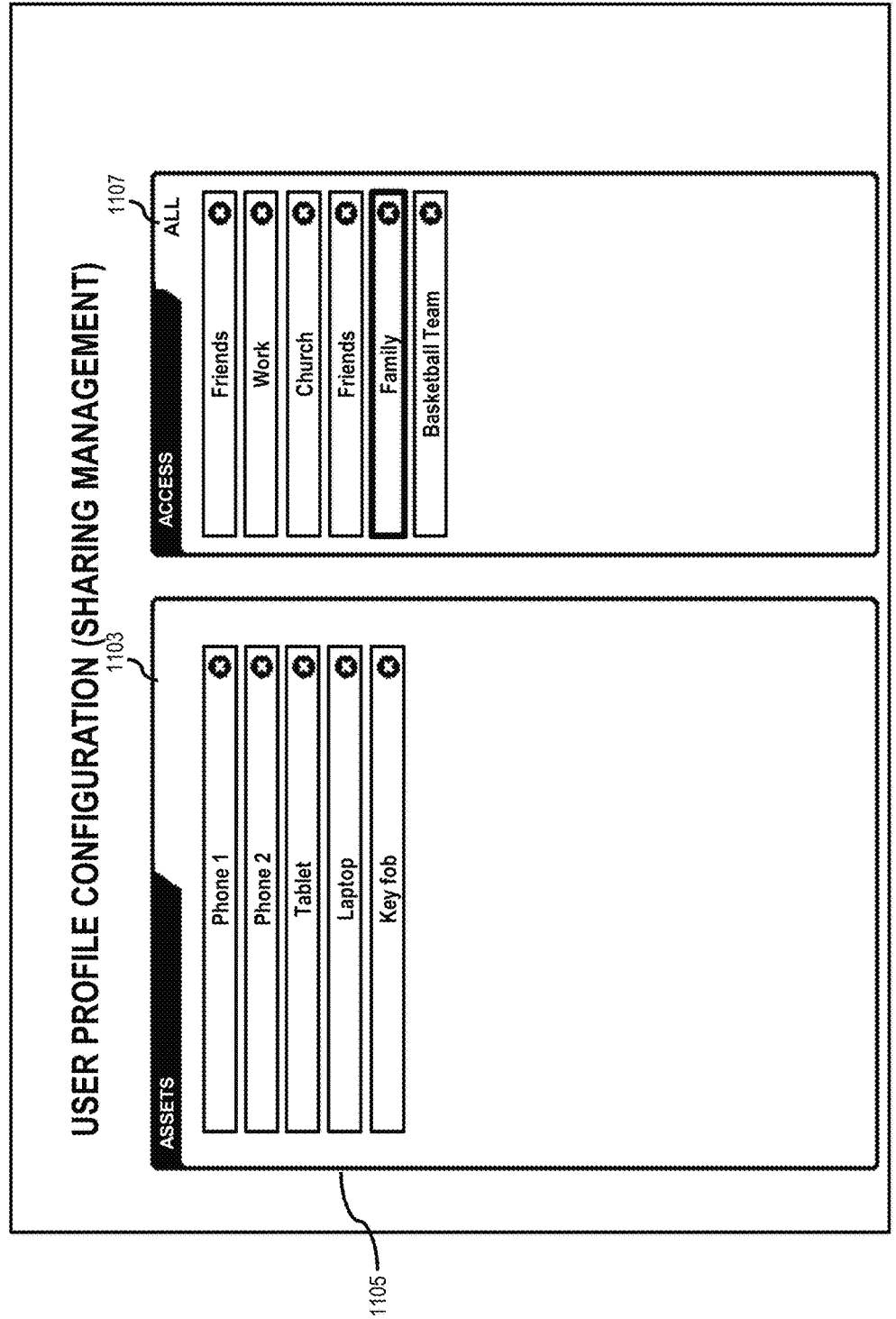
FIGS. 11A and 11B are diagrams of user interfaces for managing detected assets in a user's personal cloud, according to various embodiments.

FIG. 11A is a diagram of a user interface 1101 for managing detected assets in a user's personal cloud, according to one embodiment. The user interface 1101 has a list of assets 1103 that the user may select by choosing any of buttons 1105. When the asset or UE 101 is selected, the user may elect to view more details about that asset, or the user may select which groups of contacts 1107 may have access, or be accessed from the selected device 1105. For example, if the user wants phone 1 to be have access to information relating to family and friends, but not work, then the user would select family and friends, then the user would highlight these items in the access section 1107. As a security feature, it may, therefore be possible to block view of work from a phone 1, for example, to keep kids from meddling with work email should they grab the phone 1. The selected asset, therefore, would also be able to be updated with information regarding the selected access data. Further, by granting access, the access groups may be able to receive information from the selected device such as usage or location, if that information is elected to be shared. For example, a vendor may be selected that may have an interest in the usage, timing and location of the device for advertising purposes, or another user, such as a parent may want to have access to similar information for security purposes. But, the user of the PPS may elect to block certain transfer of information by withholding access to the asset for specific data if the user so chooses.

Figure 11B:
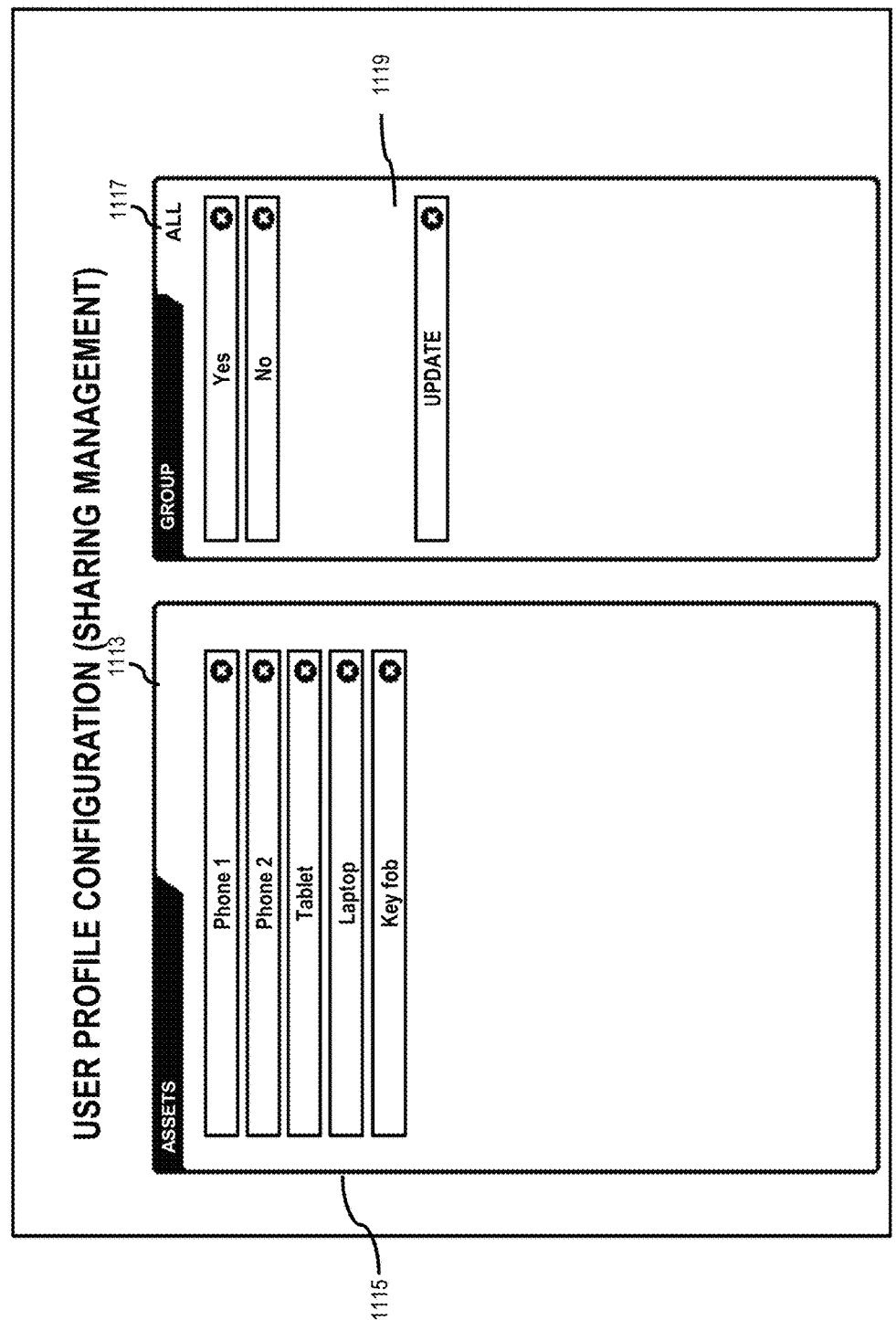

FIG. 11B is a diagram of a user interface 1111 for managing detected assets in a user's personal cloud, according to one embodiment. The user interface 1111 has a list of assets 1113 that the user may select by choosing any of buttons 1115. The assets 1113 are UE 101's that are detected by the asset management platform 109 when they are within range of the local sensor 103. The user may select any of the assets, elect to view more details about that asset, or may designate that the selected asset is part of group or the user's personal cloud at 1117, for example. If the asset is determined to be part of the user's personal cloud, the user may choose the update button 1119 to update the selected device with updated contact information and/or other user preferences, or information about other devices that are part of the user's personal cloud, for example.

Figure 12:
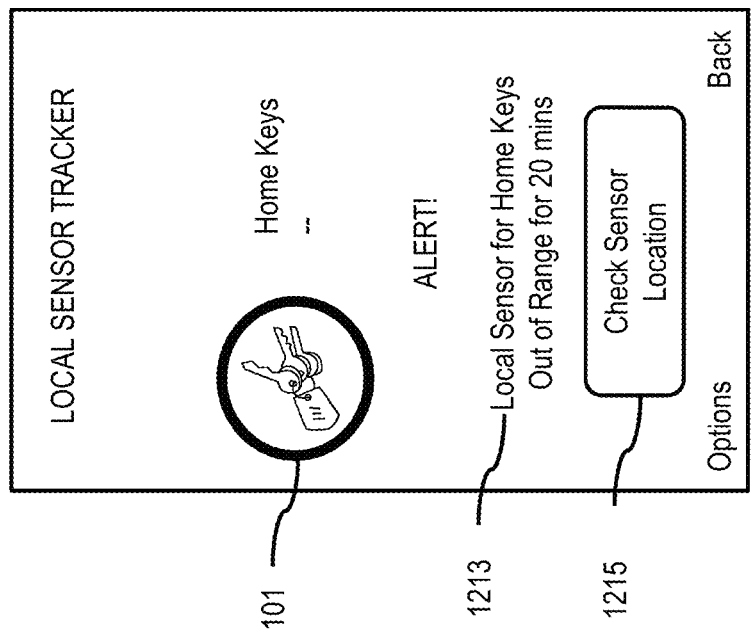
FIG. 12 is a user interface in which an asset is no longer within range of a local sensor, according to one embodiment.

FIG. 12 is a user interface 1201 in which a UE 101 is no longer within range of the local sensor 103, according to one embodiment. Accordingly, a description 711 does not include a directional heading or distance provided in the user interface 1201 between the asset and the user. Additionally, the user interface 1201 includes an alert 1213 to inform the user that the local sensor associated with the home keys (and, therefore, most likely the home keys as well) has been outside the range of the local sensor manager for 20 mins (which, in this example, is the predetermined time for determining that an item is lost). Based on the alert, an option 1215 to "Check Sensor Location" can be used to determine whether the local sensor has sent its location to the asset management platform 109 through, for instance, any nearby UEs 101. The lost profile for the local sensor 103 can be automatically activated when the local sensor 103 is out of range of the paired UE 101 for over the predetermined period of time. In one embodiment, activating the lost profile automatically makes the local sensor detectable, but not directly viewable, by other UEs 101 that might be nearby. These nearby UEs 101 can then report the location of the local sensor 103 to asset management platform 109.

The processes described herein for enabling users to control the sharing of user profile information with respect to vendors based on user participation in, or value derived from, one or more vendor loyalty programs may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
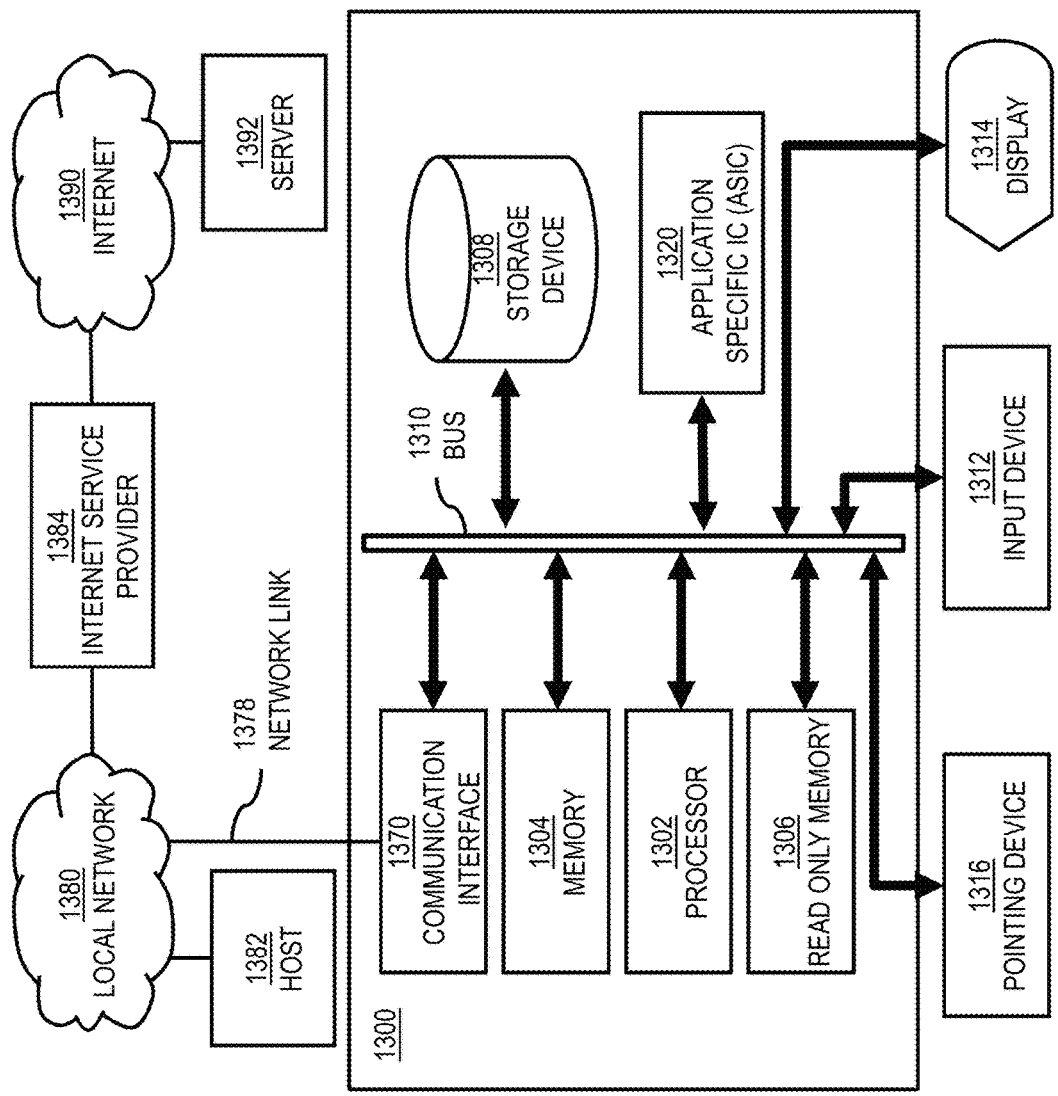
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to create an inventory of assets and enable the assets to have access to a central database of information as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of creating an inventory of assets and enabling the assets to have access to a central database of information.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to create an inventory of assets and enable the assets to have access to a central database of information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or any other dynamic storage device, stores information including processor instructions for creating an inventory of assets and enabling the assets to have access to a central database of information. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for creating an inventory of assets and enabling the assets to have access to a central database of information, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for creating an inventory of assets and enabling the assets to have access to a central database of information to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to create an inventory of assets and enable the assets to have access to a central database of information as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of creating an inventory of assets and enabling the assets to have access to a central database of information.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to create an inventory of assets and enable the assets to have access to a central database of information. The memory 1405 also stores the data associated with or generated by the execution of the inventive steps.

Figure 15:
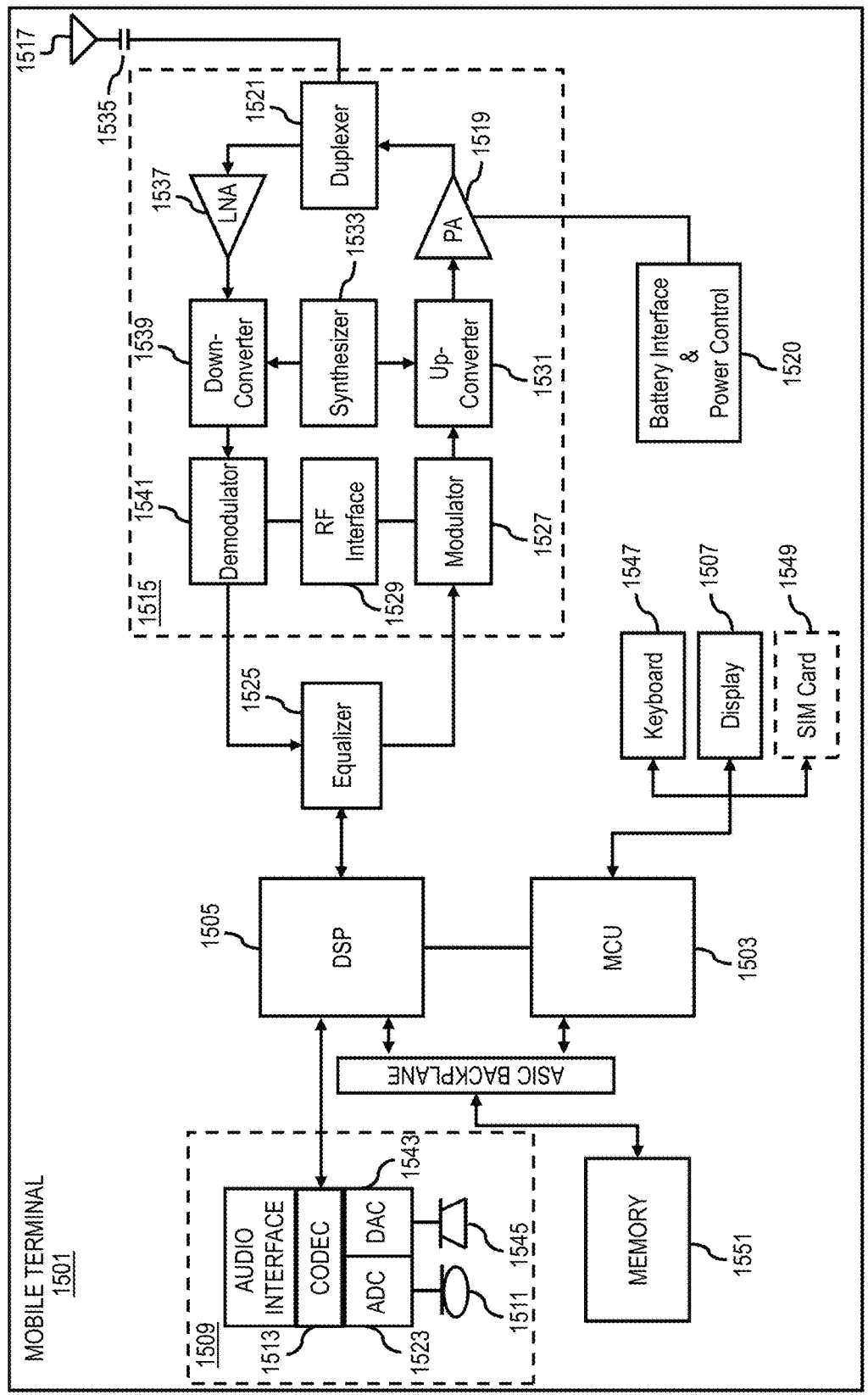
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of creating an inventory of assets and enabling the assets to have access to a central database of information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of creating an inventory of assets and enabling the assets to have access to a central database of information. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairment that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to create an inventory of assets and enable the assets to have access to a central database of information. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for controlling personal asset management, the method comprising:
   determining, utilizing at least one processor, one or more devices associated with a user to be part of one or more groups,
       wherein the one or more devices include one or more computing devices and one or more assets,
       wherein the one or more assets are respectively tagged with one or more short range wireless asset management tags and respectively associated with one or more personal cloud endpoints;
   determining one or more datasets associated with the user to be collected at and made accessible by the one or more devices that are part of the one or more groups,
       wherein the one or more datasets include computation closures and personal data associated with one or more devices and the one or more assets, and the computation closures and the personal data are formatted based on a resource description framework;
   initiating a synchronization of the one or more datasets among the one or more personal cloud endpoints of the one or more assets and one or more other cloud storage endpoints of the one or more devices that are part of the one or more groups via a cryptographic connection established between the one or more devices, by
   encrypting and transmitting the formatted computation closures and the formatted personal data via the cryptographic connection, and then
   receiving and decrypting the encrypted formatted computation closures and the encrypted formatted personal data at the one or more devices;
   establishing a connection between the determined devices that are part of the one or more groups;
   initiating a presentation via at least one user interface providing an access to the user and enabling an update and/or a sharing of at least some part of the synchronized one or more datasets while controlling the formatted personal data; and
   managing, utilizing the at least one interface, the synchronized one or more datasets and/or the one or more connected devices that are part of the one or more groups.

2. A method of claim 1, further comprising:
   determining the personal data that comprises a date interval of usage of the one or more assets, a time interval of usage of the one or more assets, a geospatial location of the one or more assets, a functional flow associated with the determining the personal data, an attribute of the one or more assets, a speed of the one or more assets, a direction of movement of the one or more assets, or any combination thereof;
   initiating a sharing of the personal data with the one or more devices; and
   initiating a storing of the personal data as part of the one or more datasets,
       wherein the improvement comprises providing the user a mechanism to securely manage the personal data via the user interface and enable the one or more devices to be accessed and updated centrally via the synchronization.

3. A method of claim 2, further comprising:
   generating a usage profile, a map of the one or more devices relative to one another, or a combination thereof based on the personal data;
   in response to a request from one of a plurality of vendors, initiating a sharing of the personal data with the vendor in exchange for incentive points provided to the one or more devices;
   maintaining incentive point exchange rates among the vendors across countries;
   monetizing the incentive points per vendor; and
   initiating a display of an exchange rate comparison table of the competitors at at least one of the one or more devices based on results of the monetizing.

4. A method of claim 3, further comprising:
   identifying at least one of the one or more devices as a favorite device based on the usage profile,
       wherein the vendors include competitors of one or more products, one or more services, or a combination thereof.

5. A method of claim 1, wherein the one or more datasets include a contact list.

6. A method of claim 2, further comprising:
   determining best deals of the vendors based on user profile information and the incentive points;
   initiating a display of the best deals at the at least one of the one or more devices; and
   managing the one or more devices that are in the one or more groups, the one or more datasets to be made accessible, or a combination thereof by way of a user interface.

7. A method of claim 1, further comprising:
   determining when at least one of the one or more assets is beyond a predetermined distance from the at least one of the one or more computing devices; and
   presenting an indication of a change in a status of the at least one of the one or more assets based on the determination.

8. A method of claim 7, wherein a position of the at least one of the one or more assets with respect to the at least one of the one or more devices is determined based on a short range communication link between the at least one of the one or more devices and at least one of the short range wireless asset management tags associated with the one or more assets.

9. A method of claim 7, wherein a position of the at least one of the one or more assets with respect to the at least one of the one or more devices is determined by triangulating a location of the at least one of the one or more assets or the at least one of the one or more devices.

10. A method of claim 1, further comprising:
determining duplicate data entries in the one or more datasets; and
removing the determined duplicate data entries found in the datasets when the one or more datasets are synchronized.

11. An apparatus for controlling personal asset management, the apparatus comprising:
at least one processor; and
at least one memory including computer program code for one or more programs,
the at least one memory and the computer program code configured to, with the at least one processor, cause the apparatus to perform at least the following,
determine one or more devices associated with a user to be part of one or more groups,
wherein the one or more devices include one or more computing devices and one or more assets,
wherein the one or more assets are respectively tagged with one or more short range wireless asset management tags and respectively associated with one or more personal cloud endpoints;
determine one or more datasets associated with the user to be collected at and made accessible by the one or more devices that are part of the one or more groups,
wherein the one or more datasets include computation closures and personal data associated with one or more devices and the one or more assets, and the computation closures and the personal data are formatted based on a resource description framework;
initiate a synchronization of the one or more datasets among the one or more personal cloud endpoints of the one or more assets and one or more other cloud storage endpoints of the one or more devices that are part of the one or more groups via a cryptographic connection established between the one or more devices, by encrypting and transmitting the formatted computation closures and the formatted personal data via the cryptographic connection, and then receiving and decrypting the encrypted formatted computation closures and the encrypted formatted personal data at the one or more devices;
establish a connection between the determined devices that are part of the one or more groups;
initiate a presentation via at least one user interface providing an access to the user and enabling an update and/or a sharing of at least some part of the synchronized one or more datasets while controlling the formatted personal data; and
manage, utilizing the at least one interface, the synchronized one or more datasets and/or the one or more connected devices that are part of the one or more groups.

12. An apparatus of claim 11, wherein the apparatus is further caused to perform the following:
determine the personal data that comprises a date interval of usage of the one or more assets, a time interval of usage of the one or more assets, a geospatial location of the one or more assets, a functional flow associated with the determining the personal data, an attribute of the one or more assets, a speed of the one or more assets, a direction of movement of the one or more assets, or any combination thereof;
share the personal data with the one or more devices; and
store the personal data as part of the one or more datasets,
wherein the improvement comprises providing the user a mechanism to securely manage the personal data via the user interface and enable the one or more devices to be accessed and updated centrally via the synchronization.

13. An apparatus of claim 12, wherein the apparatus is further caused to perform the following:
generate a usage profile, a map of the one or more devices relative to one another, or a combination thereof based on the personal data;
in response to a request from one of a plurality of vendors, initiating a sharing of the personal data with the vendor in exchange for incentive points provided to the one or more devices;
maintain incentive point exchange rates among the vendors across countries;
monetize the incentive points per vendor; and
initiate a display of an exchange rate comparison table of the competitors at at least one of the one or more devices based on results of the monetizing.

14. An apparatus of claim 13, wherein the apparatus is further caused to perform the following:
identify at least one of the one or more devices as a favorite device based on the usage profile,
wherein the vendors include competitors of one or more products, one or more services, or a combination thereof.

15. An apparatus of claim 11, wherein the one or more datasets include a contact list.

16. An apparatus of claim 11, wherein the apparatus is further caused to perform the following:
determine best deals of the vendors based on user profile information and the incentive points;
initiate a display of the best deals at the at least one of the one or more devices; and
manage the one or more devices that are in the one or more groups, the one or more datasets to be made accessible, or a combination thereof by way of a user interface.

17. An apparatus of claim 11, wherein the apparatus is further caused to perform the following:
determine when at least one of the one or more assets is beyond a predetermined distance from the at least one of the one or more computing devices; and
present an indication of a change in a status of the at least one of the one or more assets based on the determination.

18. An apparatus of claim 17, wherein a position of the at least one of the one or more assets with respect to the at least one of the one or more devices is determined based on a short range communication link between the at least one of the one or more devices and at least one of the short range wireless asset management tags associated with the one or more assets.

19. An apparatus of claim 17, wherein a position of the at least one of the one or more assets with respect to the at least one of the one or more devices is determined by triangulating a location of the at least one of the one or more assets or the at least one of the one or more devices.

20. An apparatus of claim 11, wherein the apparatus is further caused to perform the following:
determine duplicate data entries in the one or more datasets; and remove the determined duplicate data entries found in the datasets when the one or more datasets are synchronized.

* * * * *